US008722120B2

(12) United States Patent
Anthony et al.

(10) Patent No.: US 8,722,120 B2
(45) Date of Patent: May 13, 2014

(54) AMINO ACID-BASED NUTRITIONAL FORMULATIONS

(75) Inventors: Joshua C. Anthony, Evansville, IN (US); Robert A. Burns, Montville, NJ (US); Yung H. Lee, Evansville, IN (US); Win-Chin Chiang, Newburgh, IN (US); Khaled A. Khatib, Newburgh, IN (US); John R. Euber, Evansville, IN (US); John R. Reckelhoff, Evansville, IN (US)

(73) Assignee: Mead Johnson Nutrition Company, Glenview, IL (US)

( * ) Notice: Subject to any disclaimer, the term of this patent is extended or adjusted under 35 U.S.C. 154(b) by 1504 days.

(21) Appl. No.: 11/497,847

(22) Filed: Aug. 2, 2006

(65) Prior Publication Data

US 2008/0032002 A1    Feb. 7, 2008

(51) Int. Cl.
*A23L 1/30* (2006.01)
*A23L 1/035* (2006.01)
*A23L 1/29* (2006.01)
*A23L 1/305* (2006.01)

(52) U.S. Cl.
CPC ............... *A23L 1/035* (2013.01); *A23L 1/296* (2013.01); *A23L 1/3051* (2013.01)
USPC .......................................................... 426/72

(58) Field of Classification Search
CPC ....................................................... A23L 1/035
USPC ............................................................ 426/72
See application file for complete search history.

(56) References Cited

U.S. PATENT DOCUMENTS

| 4,368,204 | A | 1/1983 | Sato et al. | |
| 5,576,351 | A | 11/1996 | Yoshimura et al. | |
| 5,922,766 | A | 7/1999 | Acosta et al. | 514/561 |
| 6,024,994 | A * | 2/2000 | Jacobson et al. | 426/74 |
| 6,245,803 | B1 | 6/2001 | Acosta et al. | 514/440 |
| 6,365,218 | B1 | 4/2002 | Borschel et al. | 526/573 |
| 6,475,506 | B1 | 11/2002 | Inoue et al. | |
| 6,589,576 | B2 | 7/2003 | Borschel et al. | 426/72 |
| 6,645,543 | B2 * | 11/2003 | Gohman et al. | 426/601 |
| 6,811,801 | B2 | 11/2004 | Nguyen et al. | 426/250 |
| 2003/0099722 | A1 | 5/2003 | Baxter | |
| 2003/0118703 | A1 | 6/2003 | Nguyen et al. | |
| 2003/0134851 | A1 | 7/2003 | Baxter et al. | |
| 2003/0165606 | A1 | 9/2003 | Lasekan et al. | |
| 2004/0081708 | A1 | 4/2004 | Baxter | |
| 2004/0101596 | A1 | 5/2004 | Ndife et al. | |
| 2005/0031736 | A1 | 2/2005 | Nguyen et al. | |

FOREIGN PATENT DOCUMENTS

| EP | 0705542 A1 | 4/1996 |
| WO | WO 99/37167 | 7/1999 |
| WO | WO 01/78532 A1 | 10/2001 |

OTHER PUBLICATIONS

Alegria, A., et al., *Amino Acid Contents of Infant Formulas*, Journal Food Composition and Analysis 12, 137-146 (1999).
Host, A., et al., *Dietary Products Used in Infants for Treatment and Prevention of Food Allergy*, Arch. Dis. Child 81:80-84 (1999).
Sampson, H.A., Food Allergy. Part 1: Immunopathogenesis and Clinical Disorders, J. Allergy Clin Immunol. 103:717-728 (1999).
Halken, S. et al., The Effect of Hypoallergenic Formulas in Infants at Risk of Allergic Disease, Eur. J. Clin. Nutr. 49(S1):S77-S83 (1995).
Hudson M.J., Product Development Horizons—A View from Industry, Eur. J. Clin. Nutr. 49 (S1):S64-S70 (1995).
Giampietro P.G., et al., Hypoallergenicity of an Extensively Hydrolyzed Whey Formula, Pediatr. Allergy Immunol. 12:83-86 (2001).
Zieger R.S., et al., Soy Allergy in Infants and Children with IgE-Associated Cow's Milk Allergy, J. Pediatr. 134:614-622 (1999).
Reeds, et al., *Intestinal Glutamate Metabolism*, J. Nutr. 130: 978S-982S (2000).
Reeds, et al., *Glutamine and the Bowel*, J. Nutr. 131:2505S-2508S (2001).
Heine, et al., *The Importance of Alpha-Lactalbumin in Infant Nutrition*, J. Nutr. 121: 277-283 (1991).
Gaull, et al., *Milk Protein Quantity and Quality in Low-Birthweight Infants. III. Effects on Sulfur Amino Acids in Plasma and Urine*, J. Pediatr. 90:348-355 (1977).

* cited by examiner

*Primary Examiner* — Wu-Cheng Winston Shen
*Assistant Examiner* — Yih-Horng Shiao
(74) *Attorney, Agent, or Firm* — Waddey & Patterson, P.C.; James R. Cartiglia

(57) ABSTRACT

The present invention relates to an amino acid-based nutritional formulation comprising, per 100 g total amino acids, between about 4.5 and about 5 g glutamate. The ratio of cysteine:methionine is in the range of about 0.9:1 to about 1:1.2. The nutritional formulation may also comprise a lipid source, a carbohydrate source, an emulsifier comprising CITREM or DATEM, and amino acids, wherein glutamate is present in an amount of between about 4.5 and about 5 g per 100 g total amino acids.

39 Claims, 15 Drawing Sheets

AMINO ACID-BASED NUTRITIONAL FORMULATIONS

BACKGROUND OF THE INVENTION (1) Field of the Invention

The present invention relates to amino acid-based nutritional formulations.

(2) Description of the Related Art

Food allergy is an immunologically mediated clinical syndrome that may develop after the ingestion of a dietary product. The adverse reaction that accompanies a food allergy is often an immediate immunoglobulin-E ("Ig-E") mediated reaction to dietary protein, otherwise known as a food protein allergy. Host, A., et al., *Dietary Products Used in Infants for Treatment and Prevention of Food Allergy*, Arch. Dis. Child 81:80-84 (1999). The spectrum of disorders caused by protein allergies is wide and may include angioedema, edema, atopic dermatitis, urticaria, eczema, asthma, rhinitis, conjunctivitis, vomiting, or anaphylaxis. Other reactions may be T-cell mediated and not associated with a specific IgE reaction, such as enterocolitis syndrome, proctocolitis, enteropathy, and a subset of allergic eosinophilic esophagitis/enteropathy.

Cow's milk allergy is the most common food protein allergy in young children and occurs in about 2% to 3% of all infants. Sampson, H. A., *Food Allergy. Part 1: Immunopathogenesis and Clinical Disorders*, J Allergy Clin. Immunol. 103:717-728 (1999). When certain infants are exposed to non-human milk, they can develop antibodies to foreign proteins found therein. Research has shown that potential allergens found in both milk- and soybean-based formulas are stable to digestion in the stomach for as long as 60 minutes (as compared to human milk protein which is digested in the stomach within 15 minutes). The foreign proteins then pass through the stomach and reach the intestines intact, where they gain access and can cause sensitization. The infant's immune system then "attacks" the foreign proteins, resulting in symptoms of an allergic reaction.

One possible explanation for the prevalence of protein allergies among infants is that intact cow's milk protein, which is found in most conventional infant formulas, is the earliest and most common food allergen to which infants and children are exposed. In fact, about 80% of formulas on the market are cow's milk-based.

Infant formulas and children's nutritional products have been designed to try to reduce the symptoms of protein allergies. One such formula is an extensively hydrolyzed cow's milk formula. Typically, the proteins in extensively hydrolyzed formulas have been treated with enzymes to break down some or most of the proteins that cause adverse symptoms with the goal of reducing allergic reactions, intolerance, and sensitization.

While extensive protein hydrolysates are less allergenic, they are not completely allergen-free. Halken S, et al., *The Effect of Hypoallergenic Formulas in Infants at Risk of Allergic Disease*, Eur. J. Clin. Nutr. 49(S1):S77-S83 (1995). Even residual peptides or small amounts of undigested protein may result in allergic symptoms. Further, the new protein structures created by the enzymes in hydrolyzed formulas may actually provoke an allergic response. Hudson M. J., *Product Development Horizons—A View from Industry*, Eur. J. Clin. Nutr. 49(S1):S64-S70 (1995). In fact, among children who are allergic to cow's milk, almost 10% are also sensitive to protein hydrolysate formulas. Giampietro P. G., et al., *Hypoallergenicity of an Extensively Hydrolyzed Whey Formula*, Pediatr. Allergy Immunol. 12:83-86 (2001).

Another alternative to cow's milk formula is a soy protein-based infant formula. Unfortunately, however, soy protein formulas can also cause allergies or intolerance reactions. In fact, about 8% to 14% of infants who are allergic to cow's milk are also allergic to the protein in soy formulas. Zeiger R. F., et al., *Soy Allergy in Infants and Children with IgE-Mediated Cow Milk Allergy*, J. Pediatr. 134:614-622 (1999). Infants with a previous history of cow's milk protein allergy or intolerance have a greater risk of developing soy protein allergy or intolerance, possibly due to the damage to the intestinal mucosa caused by cow milk proteins. This damage may allow an increased uptake of soy proteins, precipitating further reactions and symptoms.

Thus, for infants or children that have allergic reactions to hydrolyzed or soy-based products, a nutritional formulation based on amino acids is often the solution. Amino acids are the basic structural building units of protein. Breaking the proteins down to their basic chemical structure (completely pre-digested) makes amino acid-based formulas the most hypoallergenic formulas available. Commercially available amino acid based-formulas and nutritional supplements include Neocate®, EleCare®), and Vivonex® Pediatric.

For the infant or child that has multiple food protein intolerances or allergies, the amino acid-based nutritional formulation should contain an appropriate balance of amino acids. If possible, the ratios and amounts of amino acids in the nutritional formulation should mimic those found in breast milk. In addition, added constituents, such as emulsifiers, should avoid adding allergenic levels of protein to the formulation. From the foregoing, it can be seen that a need exists for an amino-acid based nutritional formulation which provides an appropriate balance of amino acids, includes an effective emulsification, and limits potentially allergenic levels of protein into the formulation via the emulsifying agent.

SUMMARY OF THE INVENTION

Briefly, an embodiment of the invention is directed to a novel amino acid-based nutritional formulation comprising, per 100 g total amino acids, between about 4.5 and 5 g glutamate. The ratio of cysteine:methionine in the nutritional formulation can be in the range of about 0.9:1 to about 1:1.2.

Other embodiments of the invention are directed to a protein-free nutritional formulation comprising a lipid source, a carbohydrate source, an emulsifier comprising citric acid esters of mono-diglycerides ("CITREM"), and amino acids. In this nutritional formulation, glutamate is present in an amount of between about 4.5 and 5 g per 100 g total amino acids and the ratio of cysteine:methionine is in the range of about 0.9:1 to about 1:1.2.

In yet another embodiment, the invention is directed to a protein-free nutritional formulation comprising a lipid source, a carbohydrate source, an emulsifier comprising diacetyl tartaric acid esters of mono-diglycerides ("DATEM"), and amino acids. This nutritional formulation comprises glutamate in an amount of between about 4.5 and 5 g per 100 g total amino acids and the ratio of cysteine:methionine is in the range of about 0.9:1 to about 1:1.2.

BRIEF DESCRIPTION OF THE DRAWINGS

For a more complete understanding of the present invention, reference is now made to the following descriptions taken in conjunction with the accompanying drawings.

DETAILED DESCRIPTION OF SEVERAL EMBODIMENTS

Figure 1:
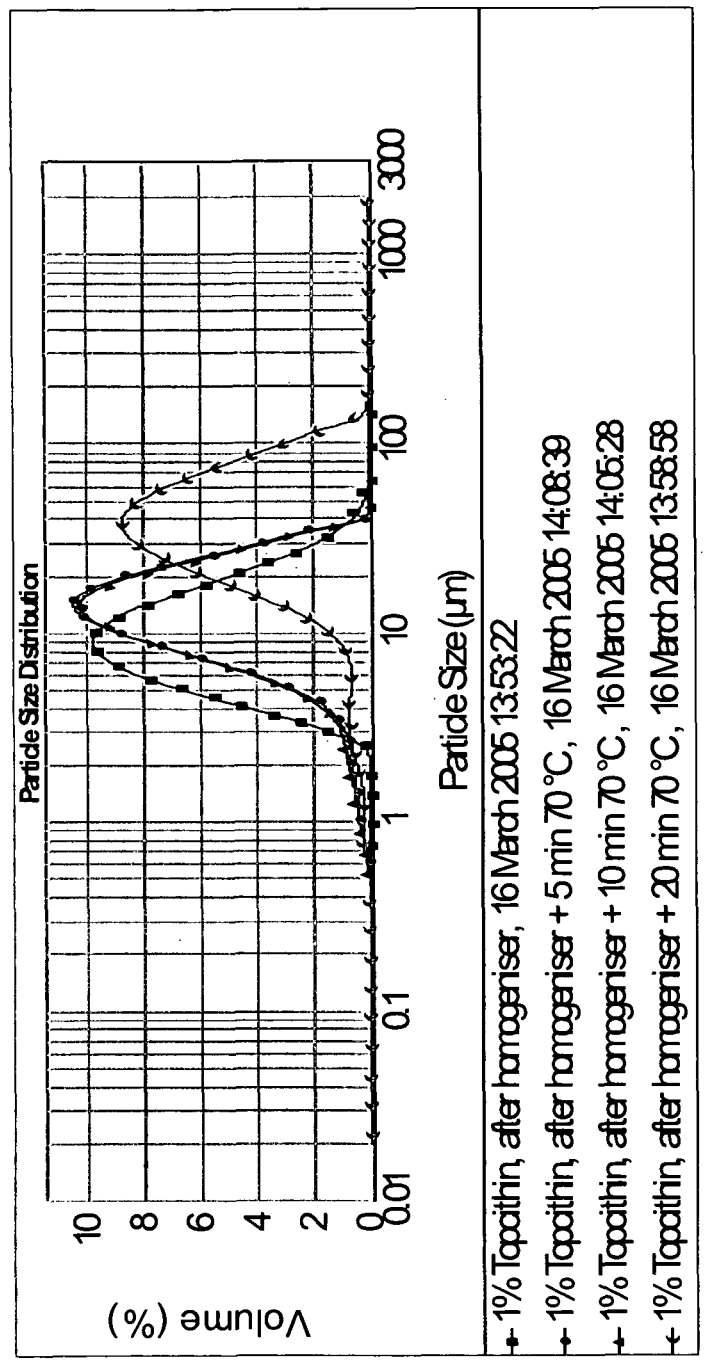
FIG. 1 illustrates the particle size distribution of emulsions made with 1% Topcithin NGM lecithin after circulation at 70° C. for 0 minutes, 5 minutes, 10 minutes, and 20 minutes.

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment.

Thus, it is intended that the present invention covers such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

In certain embodiments, the nutritional formulation of the present invention comprises an amino acid-based nutritional formulation comprising, per 100 g total amino acids, between about 4.5 and 5 g glutamate and wherein the ratio of cysteine:methionine is in the range of about 0.9:1 to about 1:1.2. In this embodiment, the nutritional formulation is protein-free and allergen-free.

The term "protein-free" means containing no measurable amount of protein.

The terms "nutritional formulation" mean any composition that either satisfies the nutrient requirements of a subject or supplements the diet of a subject. In some embodiments, the nutritional formulation is an infant formula. In other embodiments, the nutritional formulation is a child's nutritional product.

As used herein, the terms "infant formula" mean a composition that satisfies the nutrient requirements of an infant by being a substitute for human milk.

The term "infant", as used in the present application, means a postnatal human that is less than about 1 year of age.

The terms "child" and "children" mean a postnatal human that is between the ages of about 1 year and 10 years.

The terms "amino acid-based" mean that the formulation contains free amino acids as the protein equivalent. In some embodiments, the amino acids are L-amino acids.

The term "allergy" refers to hypersensitivity reactions of the immune system to specific allergens that may result in adverse symptoms.

The term "intolerance", as used herein, relates to particular adverse effects that occur after eating a substance, but which do not involve the immune system. For example, food intolerances may occur because the digestive system does not produce sufficient quantities of a particular enzyme or chemical which is needed to break down food and aid in digestion.

In contrast to currently available products, the nutritional formulation of the present invention provides a ratio of cysteine:methionine that mimics the ratio in breast milk. For example, in some embodiments, the ratio of cysteine:methionine is about 1:1.138. In other embodiments, the nutritional formulation contains between about 50 and 100 mg/100 kcal cysteine. In still other embodiments, the nutritional formulation contains between about 60 and 80 mg/100 kcal cysteine. In particular embodiments, the nutritional formulation contains between about 70 and 75 mg/100 kcal cysteine. In a certain embodiment, the nutritional formulation contains about 73.5 mg/100 kcal cysteine.

In an embodiment, the nutritional formulation contains between about 50 and 100 mg/100 kcal methionine. In still other embodiments, the nutritional formulation contains between about 60 and 80 mg/100 kcal methionine. In particular embodiments, the nutritional formulation contains between about 60 and 70 mg/100 kcal methionine. In a certain embodiment, the nutritional formulation contains about 64.6 mg/100 kcal methionine.

An appropriate ratio of cysteine:methionine may be important to support mucosal health. Cysteine is a component of glutathione which protects the mucosa from oxidative damage and dietary toxins. Reeds, et al., *Intestinal Glutamate Metabolism*, J. Nutr. 130: 978S-982S (2000). Cysteine is also a precursor for taurine which is found in high concentrations in the brain of neonates. Heine, et al., *The Importance of Alpha-Lactoglobulin in Infant Nutrition*, J. Nutr. 121: 277-283 (1991). Mammals can synthesize cysteine from methionine and serine; however, immature mammals may have limited capacity to synthesize the amino acid. Gaull, et al., *Milk Protein Quantity and Quality in Low-Birthweight Infants. III. Effects on Sulfur Amino Acids in Plasma and Urine*, J. Pediatr. 90:348-355 (1977). Therefore, providing cysteine and methionine in an appropriate ratio may support optimal growth and development in infants.

An additional improvement of the present invention over those of the prior art is the use of glutamate to support gastrointestinal development and mucosal health. In existing elemental products, glutamate nitrogen is often replaced by increasing the glutamine content or distributing the nitrogen among other amino acids. Free glutamine, however, is not stable in a liquid matrix and may not be suitable for ready-to-use nutritional formulations. Thus, in some embodiments, the invention described herein does not contain glutamine.

In a particular embodiment of the invention, up to 75% of the glutamate nitrogen is distributed onto the transaminating amino acids, alanine and aspartate. Distribution of the glutamate nitrogen to alanine and aspartate may support the endogenous synthesis of glutamate from transamination reactions with these amino acids and a-ketoglutarate in the enterocyte.

In an embodiment of the invention, the nutritional formulation comprises about 5 g glutamate per 100 g total amino acids. In other embodiments, the nutritional formulation comprises between about 150 and 200 mg/100 kcal glutamate. In still other embodiments, the nutritional formulation comprises between about 160 and 180 mg/100 kcal glutamate. In a particular embodiment, the nutritional formulation comprises about 167 mg/100 kcal glutamate. In certain embodiments, glutamate comprises 5% of the total amino acids present in the formulation.

The nutritional formulation of the present invention can also contain an emulsifying agent comprising CITREM or DATEM. In some embodiments, the emulsifying agent is protein-free.

CITREM is a group of citric acid esters of the mono- and diglycerides of edible fatty acids containing 1-2 molecules of edible fatty acids and 1-2 molecules of citric acid. The citric acid as a tribasic acid may also be esterified with several glycerides, and as a hydroxy acid may also be esterified with fatty acids. As used herein, the term CITREM could be exchanged for citroglyceride, citric acid glyceride ester, or monoglyceride citrate. A possible structure for CITREM is shown below.

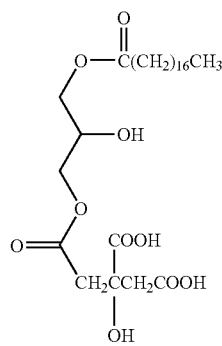

In an embodiment, CITREM is present in the nutritional formulation in an amount of between about 0.05 and 1.0 kg/100 kg nutritional formulation. In another embodiment, CITREM is present in the nutritional formulation in an amount of between about 0.4 and 0.5 kg/100 kg nutritional formulation. In yet another embodiment, CITREM is present in the nutritional formulation in an amount of about 0.488 kg/100 kg nutritional formulation. In some embodiments, CITREM is present in an amount of less than about 7.5 g/L nutritional formulation. In a particular embodiment, CITREM is the sole emulsifier in the nutritional formulation. CITREM can be purchased commercially as GRINDSTED® CITREM from Danisco A/S, located in Copenhagen, Denmark.

DATEM comprises mixed glycerol esters of mono- and diacetyltartaric acid and fatty acids of food fats. It can be manufactured either by the interaction of diacetyltartaric anhydride and mono- and diglycerides of fatty acids in the presence of acetic acid, or by interaction of acetic anhydride and mono- and diglycerides of fatty acids in the presence of tartaric acid. Owing to inter- and intramolecular acyl group exchange, the two methods of production result in essentially the same components, the distribution of which depends on the relative proportions of the basic raw materials, temperature, and reaction time. A possible structure for DATEM is shown below.

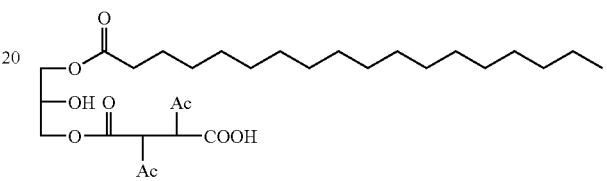

In an embodiment, DATEM is present in the nutritional formulation in an amount of between about 0.05 and 1.0 kg/100 kg nutritional formulation. In another embodiment, DATEM is present in the nutritional formulation in an amount of between about 0.4 and 0.5 kg/100 kg nutritional formulation. In yet another embodiment, DATEM is present in the nutritional formulation in an amount of about 0.488 kg/100 kg nutritional formulation. In some embodiments, DATEM is present in an amount of between about 1.0 to 10.0 g/L nutritional formulation. In a particular embodiment, DATEM is the sole emulsifier in the nutritional formulation. DATEM can be purchased commercially as PANODAN® DATEM from Danisco A/S, located in Copenhagen, Denmark.

Both CITREM and DATEM are fat-based emulsifiers that are free of protein. They provide emulsion capacity and stability in amino acid-based nutritional formulation. They also provide creaminess to the stabilized emulsions. Each of these emulsifiers consists of a hydrophilic and hydrophobic portion. The hydrophobic portion of the emulsifier consists of fatty acids. The hydrophilic part of the emulsifier consists of glycerol that is esterified with tartaric acid or citric acid. When emulsified, CITREM and DATEM concentrate at the interface between the immiscible liquids of an amino acid-based formulation where they form interfacial films. The special ability of CITREM and DATEM to concentrate at the interface between two immiscible liquids is due to their hydrophilic/hydrophobic structure.

The nutritional formulation of the present invention can be a term infant formula or a preterm infant formula. In an embodiment, the nutritional formulation for use in the present invention is nutritionally complete and contains suitable types and amounts of free amino acids, lipids, carbohydrates, vitamins and minerals. The nutritional formulation can be powdered, liquid, or ready to use.

In one embodiment, the nutritional formulation contains a lipid source. The amount of lipid can typically vary from about 3 to about 7 g/100 kcal. Lipid sources can be any known or used in the art, e.g., vegetable oils such as palm oil, canola oil, corn oil, soybean oil, palmolein, coconut oil, medium chain triglyceride oil, high oleic sunflower oil, high oleic safflower oil, and the like.

In another embodiment, the nutritional formulation contains a carbohydrate source. The amount of carbohydrate typically can vary from about 8 to about 12 g/100 kcal. Carbohydrate sources can be any source known or used in the art, e.g., lactose, glucose, corn syrup solids, maltodextrins, sucrose, rice syrup solids, and the like.

In certain embodiments, the nutritional formulation of the invention is hypoallergenic. In some embodiments, the nutritional formulation is allergen-free. In other embodiments, the nutritional formulation is kosher. In still further embodiments, the nutritional formulation is a non-genetically modified product. In an embodiment, the nutritional formulation is sucrose-free. The nutritional formulation may additionally be lactose-free. In other embodiments, the nutritional formulation does not contain any medium-chain triglyceride oil. In some embodiments, no carrageenan is present in the nutritional formulation. In yet other embodiments, the nutritional formulation is free of all gums.

In some embodiments of the invention, the pH of the nutritional formulation is between about 5 and 8. In yet other embodiments, the pH of the nutritional formulation is between about 6 and 7. In certain embodiments, the viscosity of the reconstituted nutritional formulation can be less than about 20 centipoise (cps) at ambient temperature.

In some embodiments of the invention, the nutritional formulation is protein-free and contains less than about 1.0 ppm non-protein nitrogen. In other embodiments, the reconstituted nutritional formulation contains less than about 7 ppm non-protein nitrogen. In still other embodiments, the reconstituted nutritional formulation contains less than about 5 ppm non-protein nitrogen.

In an embodiment, the invention can comprise a method for treating an infant or child that has multiple food protein intolerances or allergies. The method comprises feeding the nutritional formulation of the invention to the infant or child. In some embodiments, the infant or child is in need of such treatment. The terms "in need" can mean that the infant or child is at risk for developing an intolerance or allergy. An infant or child may be at risk if there is a strong family history of allergy, or may be at risk due to diet, disease, trauma, or physical disorder. In some embodiments, feeding the nutritional formulation of the present invention to an infant or child having multiple food protein intolerances or allergies may prevent future occurrences of allergic reactions.

In another embodiment of the invention, docosahexaenoic acid (DHA) and arachidonic acid (ARA) are present within the nutritional formulation. DHA and ARA are long chain polyunsaturated fatty acids (LCPUFAs) which have previously been shown to contribute to the health and growth of infants. DHA and ARA are typically obtained through breast milk in infants that are breast-fed. In infants that are formula-fed, however, DHA and ARA must be supplemented into the diet. In some embodiments of the present invention, the nutritional formulation contains DHA. In some embodiments of the present invention, the nutritional formulation contains both DHA and ARA.

In an embodiment of the invention, the weight ratio of ARA:DHA ranges from about 10:1 to about 1:10. In another embodiment of the present invention, this ratio ranges from about 5:1 to about 1:5. In yet another embodiment, the ratio ranges from about 3:1 to about 1:3. In one particular embodiment the ratio ranges from about 3:1 to about 1:2. In another particular embodiment of the invention, the ratio is about 2:1.

In certain embodiments of the invention, the level of DHA is between about 0.20% and 0.50% of fatty acids. In other embodiments of the invention, the level of DHA is about 0.35% of fatty acids. In yet other embodiments of the invention, the level of ARA is between 0.60% and 0.80% of fatty acids. In a particular embodiment, the level of ARA is about 0.72% of fatty acids. In some embodiments, only DHA is supplemented into the formulation.

The amount of DHA in an embodiment of the present invention can be from about 3 mg per kg of body weight per day to about 150 mg per kg of body weight per day. In one embodiment of the invention, the amount is from about 6 mg per kg of body weight per day to about 100 mg per kg of body weight per day. In another embodiment, the amount is from about 15 mg per kg of body weight per day to about 60 mg per kg of body weight per day.

The amount of ARA in an embodiment of the present invention can be from about 5 mg per kg of body weight per day to about 150 mg per kg of body weight per day. In one embodiment of this invention, the amount varies from about 10 mg per kg of body weight per day to about 120 mg per kg of body weight per day. In another embodiment, the amount varies from about 15 mg per kg of body weight per day to about 90 mg per kg of body weight per day. In yet another embodiment, the amount varies from about 20 mg per kg of body weight per day to about 60 mg per kg of body weight per day.

The amount of DHA in nutritional formulations for use in an embodiment of the present invention can be from about 2 mg/100 kilocalories (kcal) to about 100 mg/100 kcal. In another embodiment, the amount of DHA varies from about 5 mg/100 kcal to about 75 mg/100 kcal. In yet another embodiment, the amount of DHA varies from about 15 mg/100 kcal to about 60 mg/100 kcal.

The amount of ARA in nutritional formulations for use in an embodiment of the present invention can be from about 4 mg/100 kcal to about 100 mg/100 kcal. In another embodiment, the amount of ARA varies from about 10 mg/100 kcal to about 67 mg/100 kcal. In yet another embodiment, the amount of ARA varies from about 20 mg/100 kcal to about 50 mg/100 kcal. In a particular embodiment, the amount of ARA varies from about 30 mg/100 kcal to about 40 mg/100 kcal.

The nutritional formulation supplemented with oils containing DHA and ARA for use in the present invention can be made using standard techniques known in the art. For example, an equivalent amount of an oil which is normally present in a nutritional formulation, such as high oleic sunflower oil, may be replaced with DHA and ARA.

The source of the ARA and DHA can be any source known in the art such as fish oil, single cell oil, egg yolk lipid, brain lipid, and the like. The DHA and ARA can be in natural form, provided that the remainder of the LCPUFA source does not result in any substantial deleterious effect on the infant. Alternatively, the DHA and ARA can be used in refined form.

Sources of DHA and ARA may be single cell oils as taught in U.S. Pat. Nos. 5,374,657, 5,550,156, and 5,397,591, the disclosures of which are incorporated herein by reference in their entirety.

In some embodiments of the invention, DHA is sourced from single cell oils. In another embodiment of the invention, ARA is sourced from single cell oils. In particular embodiments, both DHA and ARA are sourced from single cell oils.

The LCPUFA source may or may not contain eicosapentaenoic acid (EPA). In some embodiments, the LCPUFA used in the invention contains little or no EPA. For example, in certain embodiments that the nutritional formulations used herein contain less than about 20 mg/100 kcal EPA; in some embodiments less than about 10 mg/100 kcal EPA; in other embodiments less than about 5 mg/100 kcal EPA; and in still other embodiments substantially no EPA.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples, all percentages are given on a weight basis unless otherwise indicated.

Example 1

This example illustrates the materials and method necessary to evaluate various protein-free emulsifiers for use in the nutritional formulation of the present invention. Monoglycerides and diglycerides, lecithins, CITREM, and DATEM (see Table 1) were each evaluated as potential emulsifiers in the present study.

In this study, the various emulsifiers were tested for the ability to form emulsions suitable for the production of a nutritional formulation. In order to test the various possibilities for emulsifiers, model emulsions were prepared, including all salts that are necessary to form a base powder. It is well known that divalent ions, like calcium, can have a strong destabilizing effect in emulsions. Therefore, screening tests were performed wherein various concentrations of calcium chloride were added to emulsions. These emulsions already contained the mono-valent ions, but the calcium salts were initially excluded from the composition.

For processing flexibility, a nutritional formulation emulsifier must remain stable at elevated temperatures of 70° C. Therefore, emulsion stability was assessed at room temperature and at 70° C. The emulsions used for spray drying were stored a minimum of 2 hours at 70° C. before feeding into the spray dryer in order to assess the quality of the powders formed under these conditions. These procedures will be explained in more detail below.

Model Emulsion

For the screening of the stability of the various emulsifiers, model emulsions were prepared. These model emulsions consisted of (see Table 1) a water phase with corn syrup solids (water phase I), a water phase with soluble minerals (water phase II), a water phase with insoluble minerals (water phase III), and an oil phase with the emulsifier. During the first screening, the concentration of emulsifier was fixed at 1% (on emulsion).

TABLE 1

Emulsifier concentrations on total model emulsion.

| | Concentration |
|---|---|
| Oil phase | |
| oil | 20.6% |
| emulsifier | 1.0% |
| Water phase I | |
| corn syrup solids | 26.3% |
| water | 33.8% |
| Water phase II | |
| water | 7.6% |
| potassium citrate | 1.04% |
| sodium citrate | 0.21% |
| potassium chloride | 0.15% |
| choline chloride | 0.02% |
| calcium hydroxide | 0.05% |
| L. carnitine | 0.01% |
| Water phase III | |
| water | 7.6% |
| calciumphosphate dibasic | 1.25% |
| calcium citrate | 0.26% |
| magnesium oxide | 0.07% |

Processing

Pre-emulsions were prepared with the ingredients using a Turrax® dispersing instrument at 65° C. The pre-emulsions were used to provide an indication of the stability of the emulsions. These pre-emulsions were divided into two groups and stored at either room temperature or at 70° C. Once the screening experiments rendered relatively stable emulsions, the systems were prepared again and then subsequently homogenized at 210/35 bar at 65° C., using a Rannie 2-stage homogenizer. These emulsions were stored at 70° C. for up to 4 hours.

Analysis of Emulsions

When appropriate, the following analyses have been used. The emulsions were assessed by visual observation and light microscopy (Reichert-Jung Polyvar). Particle size distributions were measured using a Malvern Mastersizer 2000. Viscosity was measured using a Haake Rheometer M5, MV1-system (@300 $s^{-1}$).

Sensitivity to Salts, pH

In order to determine possible causes for instabilities, a series of tests were developed:
1) Emulsion stability with the full formulation.
2) Emulsion stability with the full formulation, excluding calcium hydroxide.
3) Emulsion stability with the full formulation, excluding calcium hydroxide and excluding the salts from water phase III.
4) Emulsion stability with the full formulation, excluding calcium hydroxide and excluding the salts from water phase III, and where various concentrations of calcium chloride were added.
5) Emulsion stability without any salts added; to these emulsions various concentrations of NaCl and $CaCl_2$ were added.
6) Emulsion stability without any salts added; in these emulsions the pH was varied using NaOH.

Spray Drying Tests

Selected systems were prepared on a 75 kg scale for the spray drying trials. The pre-emulsion was heated to 82° C. for 25 seconds using a Combitherm and streaming pasteurization and was subsequently homogenized at 210/35 bar using a Mantau-Collin 2-stage homogenizer. The amounts of the various ingredients used in these emulsions are given in Table 2. When other levels of emulsifier were used, this was balanced with the amount of fat blend. In case of higher levels of total solids, less water was use for water phase I, II and III.

TABLE 2

Amounts and concentrations of ingredients in emulsions used for the spray drying trials.

|  | Amount (g) | Concentration |
|---|---|---|
| Oil phase | | |
| fat blend | 14640 | 19.5% |
| pufa oil | 417.7 | 0.55% |
| Emulsifier | 600.1 | 0.80% |
| Water phase I | | |
| corn syrup solids | 19484 | 26.0% |
| Water | 24375 | 32.5% |
| Water phase II | | |
| water | 7500 | 10.0% |
| potassium citrate | 769.05 | 1.03% |
| sodium citrate | 157.50 | 0.21% |
| potassium chloride | 109.50 | 0.15% |
| choline chloride | 113.06 | 0.15% |
| calcium hydroxide | 37.14 | 0.05% |
| L. carnitine | 8.31 | 0.01% |
| sodium iodide | 0.055 | 0.0001% |
| Water phase III | | |
| water | 5625 | 7.5% |
| calciumphosphate dibasic | 923.1 | 1.23% |
| calcium citrate | 190.4 | 0.25% |
| magnesium oxide | 52.5 | 0.07% |

Spray drying tests were performed on a NIRO 250 (25 kg water evaporation per hour). Generally speaking, a product is fed by a high pressure pump and sprayed by nozzles into heated drying air. In the first drying phase, the concentrated product is dried to a moisture content of about 10 to 15%. Air and powder are separated and the major part of the wet powder will go to the internal static fluid bed, where it is heated with a second warm air stream to a moisture content of about 3 to 7%. The smallest particles, which are removed with the air on the top of the dryer, will be separated from the air by means of two cyclones. They are fed back to the internal static fluid bed of the dryer. Small particles of the second cyclone can be fed back to the top of the dryer by the fines return line. On the external vibrating bed, the product is dried by a third air stream to the desired moisture content. The powder is cooled by a fourth air stream to a temperature below 30° C. The product is then sieved or screened and packaged into bags.

In this particular embodiment, the emulsion was heated to 75° C. before inlet into the spray dryer. The inlet air temperature was 180° C. and outlet air temperature was 80° C.

Example 2

This example illustrates the evaluation of monoglyceride and diglyceride emulsifiers for use in the nutritional formulation of the present invention. The mono- and diglycerides samples were obtained from Kerry Bio-Science and Danisco, as described in Table 3.

TABLE 3

Overview of mono- and diglycerides.

| Kerry BioScience | Myverol 18-04 K | Palm |
|---|---|---|
|  | Myverol 18-08 K | Rapeseed |
|  | Myverol 18-35 K | Palm |
|  | Myverol 18-92 K | Sunflower |

TABLE 3-continued

Overview of mono- and diglycerides.

| Danisco | Admul MG 44-04 | Palm |
|---|---|---|
|  | Admul MG 60-04 K | Palm |
|  | Dimodan HR | Saturated |
|  | Dimodan UJ | Unsaturated |

None of the mono- or diglycerides rendered stable emulsions at 70° C. or at room temperature. When salts were left out of the emulsion, no stable emulsion was obtained. Strong flocculation and creaming was observed among the emulsions. Because each of the emulsions showed the same types of instabilities, further screening for mono- and diglycerides was not conducted.

Example 3

This example illustrates the evaluation of various lecithin emulsifiers for use in the nutritional formulation of the present invention. The lecithin samples were obtained from Degussa, Ovactis and Loders Croklaan. An overview is given in Table 4.

TABLE 4

Overview of lecithins tested

| Manufacturer | Lecithin | Protein content | Protein Source | Details |
|---|---|---|---|---|
| Degussa | Emulfluid F30 IP | Not detectable | Soy | |
| Degussa | Epikuron 135 F IP | Not detectable | Soy | |
| Degussa | Topcithin NGM | Max. 0.1% | Soy | |
| Degussa | PS 90 | | Soy | Pharma-grade; 90% phosphatidylserine |
| Degussa | Epikuron 200* | Not detectable | Soy | Pharma-grade; >92% phosphatidylcholine |
| Degussa | Emultop HL50* | Max 150 ppm + 0.2% phospolipase | Soy | Hydrolysed: >9% lysolecithin |
| Ovactis | Ova Lipids 60 | <50 ppm | Egg | |
| Loders Croklaan | Solec Z* | | Sunflower | |

*Lecithins obtained in a later stage and not used for the screening experiments.

Emulsion Stability—Full Composition

In a first series of experiments, emulsions were made with the full composition, including all salts. The systems were homogenized at 210/35 bar. In this series Emulfluid F30 IP, Epikuron 135 F IP, and Topcithin NGM were used.

Directly after preparation, microscopic pictures were taken in order to obtain an indication of the droplet size distribution. Topcithin NGM rendered the smallest oil droplets. Therefore, it was believed that this emulsifier would also render more stable emulsions.

These systems showed instability after 2 hours storage at 70° C. For example, flocculation, creaming and coalescence were observed. Emulfluid F30 IP and Epikuron 135 F IP showed similar behavior, while less flocculation was observed in the Topcithin NGM system. However, a free oil layer was observed on the top of the emulsion in the latter system, indicating coalescence.

Composition Excluding Calcium Hydroxide

In a second series of experiments, the pre-emulsion was studied. In this series, calcium hydroxide was excluded from the composition. It was observed that omitting calcium hydroxide has a beneficial effect on the emulsion stability for the Topcithin NGM and OvaLipids 60 systems. In both cases, the instability was less severe than when calcium hydroxide was included in the composition. The emulsion was still very unstable in the Epikuron 135 F IP system.

Composition Excluding Additional Salt

In a subsequent series of experiments, all salts were excluded from the compositions and the stability of the emulsion was investigated. In this case, the emulsions consisted of oil, emulsifier, corn syrup solids, and water. The emulsions were prepared using a Turrax® dispersion instrument (pre-emulsion, no homogenization).

The salt-free emulsions were more stable than when the salts were added. The Ovalipids 60 system showed severe creaming. Topcithin and Epikuron 135 F IP also showed some creaming, while the PS90 system remained stable.

Influence of pH

To evaluate the influence of pH on the stability of the emulsions, the pH was adjusted with NaOH. Emulsions were made without any salts and Topcithin NGM, Epikuron 135 F IP, and PS90 were used as emulsifier. Changes in pH did not have a significant impact on the stability of the emulsions.

Influence of Salts: NaCl and $CaCl_2$

In a next series of experiments, three emulsions were prepared with different lecithins. Various concentrations of NaCl and $CaCl_2$ were added to those emulsions. The concentrations are expressed as concentrations on total emulsion. Lecithins used included Topcithin NGM, Epikuron 135 F IP, and PS90.

When 5 mM NaCl was added, all systems remained stable. However, there was a significant color difference between the systems at this concentration. It is likely that the more yellow systems have a larger droplet size. When the concentration of NaCl was increased from 50 mM to 150 mM, the systems with Topcithin NGM and PS90 remained stable, while the system with Epikuron 135 F IP showed instabilities, especially creaming. The increase in color observed for the top-phase implies that coalescence had also taken place.

After 18 hours storage, the stability of the system with Topcithin was decreased. An oil layer on top of the sample became visible at elevated concentrations of NaCl. The system with PS90 showed slight creaming, but no indication of severe flocculation or coalescence was observed.

The addition of $CaCl_2$ had more severe consequences for the stability of the systems. Directly after preparation, all systems, including the systems to which only 5 mM $CaCl_2$ was added, showed instabililties.

This indicated that the instabilities in the emulsions are being caused by the divalent ions. It also implied that electrostatic interactions are the dominant factor for stability, and that adjusting the charge on the oil-water interface may be crucial to induce stability.

Systems with soluble salts, excluding calcium hydroxide, were prepared. To these systems different levels of $CaCl_2$ were added to screen the robustness of the systems with different emulsifiers. The levels of $CaCl_2$ varied from 0 mM to 20 mM. This is the concentration on total emulsion, which implies that the concentration in the water phase was approximately twice this value (corrected for total solids %). For Topcithin NGM, OvaLipids 60, and PS90 this rendered all stable systems at room temperature (timescale of hours).

It was concluded that storage at elevated temperature creates instabilities in all systems. Increasing levels of calcium chloride above 10 mM induces oil separation at 70° C. in the systems with Topcithin.

Temperature Stability: Topcithin NGM

From the previous experiments, Topcithin NGM was the most interesting commercial lecithin from all lecithins studied. Therefore, the spray drying of emulsions with Topcithin-based emulsions was studied at 70° C. as a function of holding time.

Samples were prepared, including all salts, using 1% Topcithin NGM. The samples were homogenized at 210/35 bar at 65° C. Subsequently, the samples were circulated at 70° C. Holding times were 1, 2, 5, 10 and 20 minutes.

After storage at 70° C. for 0, 5, 10 and 20 minutes, the particle size distribution of the samples was measured. As can be seen in FIG. 1, the particle size distribution increases from an average value of 8 μm to 15 μm in approximately 5-10 minutes at 70° C. At longer times at 70° C., the particle size distribution shifts to even higher values, of about 30 μm.

Upon viewing microscopic pictures of the Topcithin-based emulsion directly after homogenization and after 20 minutes circulation at 70° C., it was clear that the emulsion formed large, coalesced oil droplets.

It was concluded that it should be possible to spray dry emulsions with Topcithin NGM, as long as the holding times at 70° C. remain relatively short, preferably less than 10 minutes.

Spray Drying Trials with Topcithin NGM

After the lab trials with Topcithin wherein the emulsion stability was determined as a function of calcium-concentration and time at elevated temperature, it was decided to pursue spray drying trials on a 20 kg scale. In these experiments the emulsions were cooled after the homogenization step to reduce the time the emulsions remained at elevated temperatures.

Figure 2:
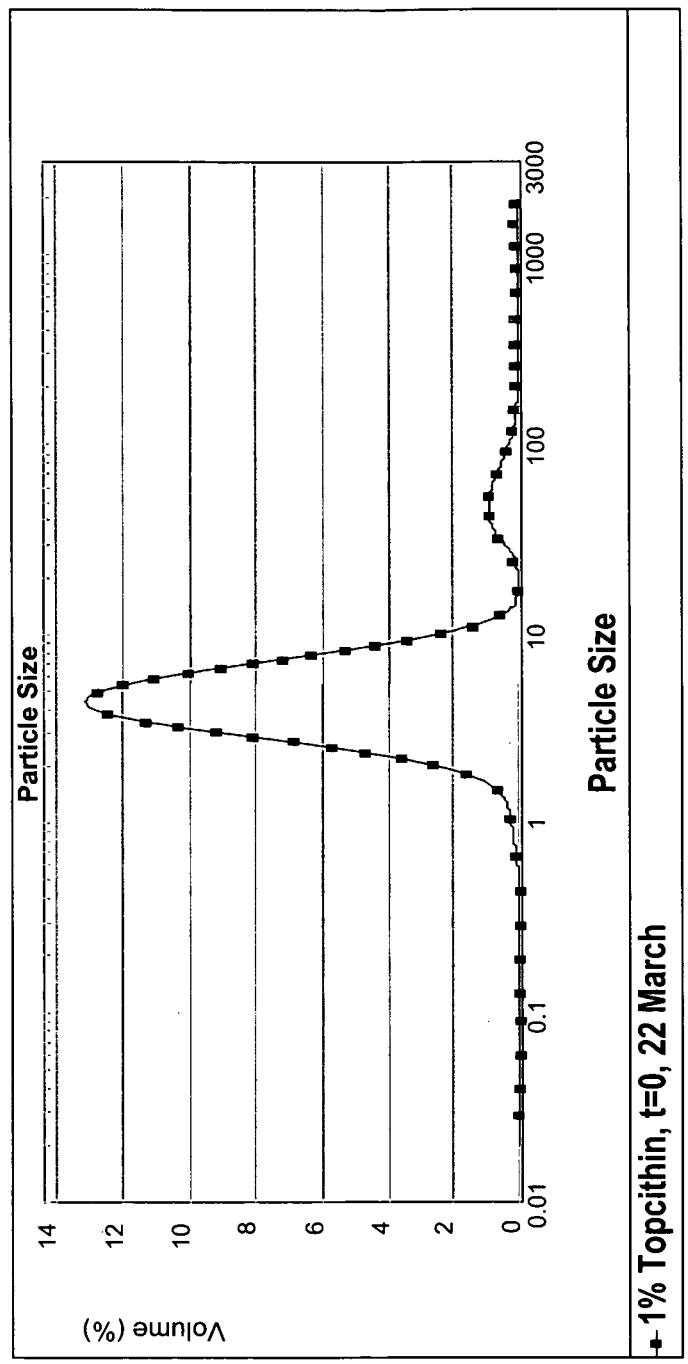
FIG. 2 illustrates the particle size distribution of a 1% Topcithin emulsion.

A pre-emulsion was made at 60° C. The pre-emulsion was then heated at 82° C. for 25 seconds, homogenized at 65° C. at 210/35 bar (2-stage homogenizer) and subsequently cooled to approximately 6° C. A sample was taken and the particle size distribution was measured (shown in FIG. 2). The sample showed slight creaming after overnight storage at room temperature, but no free oil was observed. The emulsion was then spray dried using the NIRO 250. The spray drying parameters are shown in Table 5.

TABLE 5

Spray drying parameters for the 1% Topcithin emulsion.

| Code | Description | Solids emulsion [%] | Observation after storage | Moisture powder [%] |
|---|---|---|---|---|
| 2T | 1% Topcithin | 50.2 | Creaming | 1.26 |

The total yield of the spray drying test was 19 kg powder and 4 kg sweepings. Some fouling was observed in the chamber and slightly more fouling was observed in the cyclone.

Example 4

This example illustrates the evaluation of CITREM for use as an emulsifier in the nutritional formulation of the present invention. CITREM N12 VEG, which was utilized in this example, was obtained from Danisco A/S, located in Copenhagen, Denmark.

Emulsion Stability

In a first series of experiments it was found that CITREM N12, when used at a concentration of 1%, rendered emulsions (full composition) that were stable for more than 2 hours at 70° C. Therefore various parameters in the processing were tested to get an overview of the robustness of systems prepared with CITREM N12. The influence of pH was tested, the holding time at 70° C. was varied for elongated periods up to 4 hours, and the influence of the concentration CITREM N12 was investigated.

Influence of pH

A system with full formulation and 1% CITREM N12 was prepared using homogenization at 210/35 bar at 65° C. The system was subsequently split into 4 batches. The pH of these batches was adjusted using HCl and NaOH to obtain pH values of 6, 7, 9, and 10. The pH was measured after 15 minutes and again after 2 hours at room temperature. The pH was also measured after 2 hours at 70° C. and overnight storage at room temperature. The results of the pH values are given in Table 6.

TABLE 6

Values for the pH for systems with the full formulation and 1% CITREM N12.

| System | Initial pH | After 15 minutes room temperature | After 2 hours room temperature | After 2 hours 70° C. and overnight room temperature |
|---|---|---|---|---|
| A | 6.04 | 6.29 | 6.37 | 6.27 |
| B | 7.05 | 7.16 | 7.32 | 7.21 |
| C | 9.03 | 8.65 | 8.33 | 7.66 |
| D | 10.03 | 9.57 | 9.05 | 8.44 |

From Table 6, it can be observed that the solutions are not stable with respect to pH. Over time, the systems seemed to equilibrate towards a pH value of about 7.5. Moreover, at elevated pH values, the systems became less stable (after heat treatment and overnight storage), and flocculation in combination with creaming was observed.

Influence of Concentration and Holding Time at 70° C.

Three systems (full formulation) were prepared using homogenization at 210/35 bar at 65° C., where 0.6%, 0.8% and 1.0% CITREM N12 was used as emulsifier. These systems were stored in a water bath at 70° C. for up to 4 hours. The particle size distributions were measured at t=0, 2 hours, and 4 hours. Microscopic pictures of the systems were taken at t=0 and 3 hours. The pH was measured at t=0 and after heating, cooling down, and overnight storage at room temperature.

The results for the pH measurements are given in Table 7. Small differences can be observed between the systems. There is a significant lowering of the pH after 4 hours at 70° C. and overnight storage. This is likely caused by an equilibration of the various salts in solution, specifically those salts that are only slightly soluble.

TABLE 7

Overview of the pH values for three systems with different levels of CITREM N12, directly after preparation and after 4 hours at 70° C. and overnight storage.

| Variant | Initial pH | After 4 hours 70° C. and overnight storage at room temperature (2 samples) |
|---|---|---|
| 0.6% CITREM N12 | 7.77 | 7.18-7.23 |
| 0.8% CITREM N12 | 7.75 | 7.30-7.22 |
| 1.0% CITREM N12 | 7.68 | 7.19-7.25 |

Figure 3:
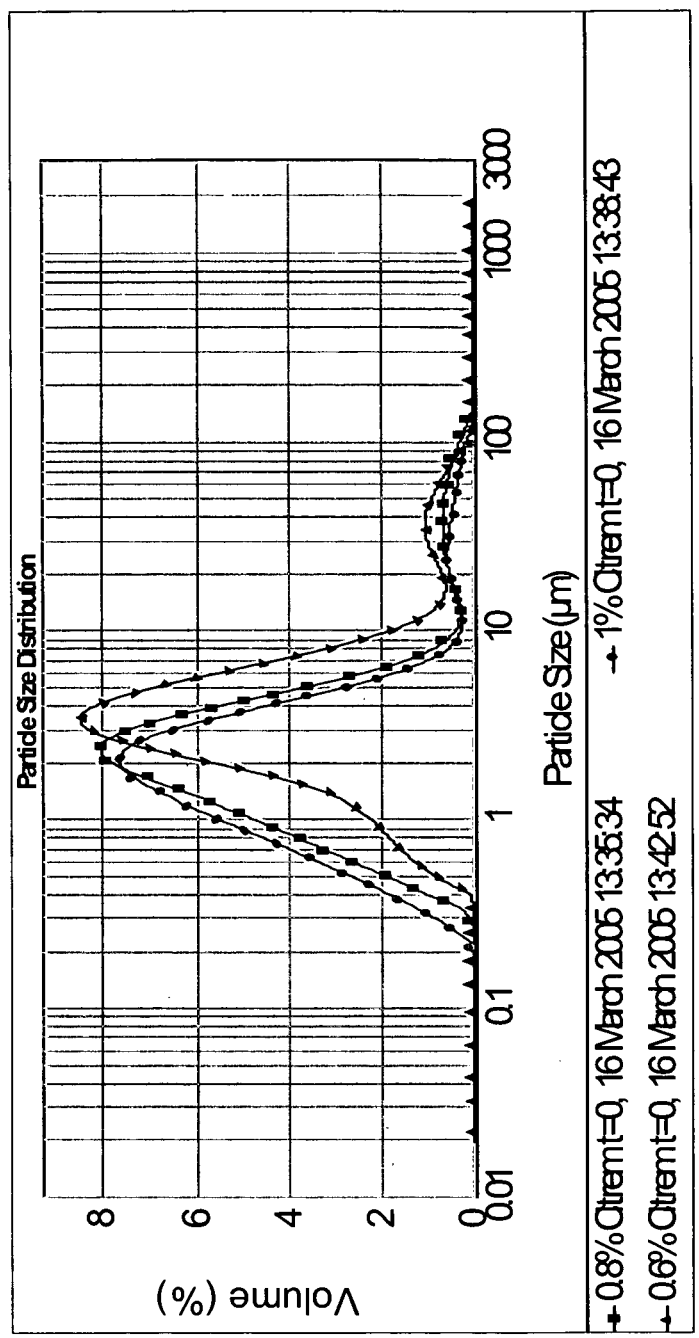
FIG. 3 illustrates the initial particle size distributions of emulsions with three different levels of CITREM N12: 0.6% 0.8%, and 1.0%.
Figure 4:
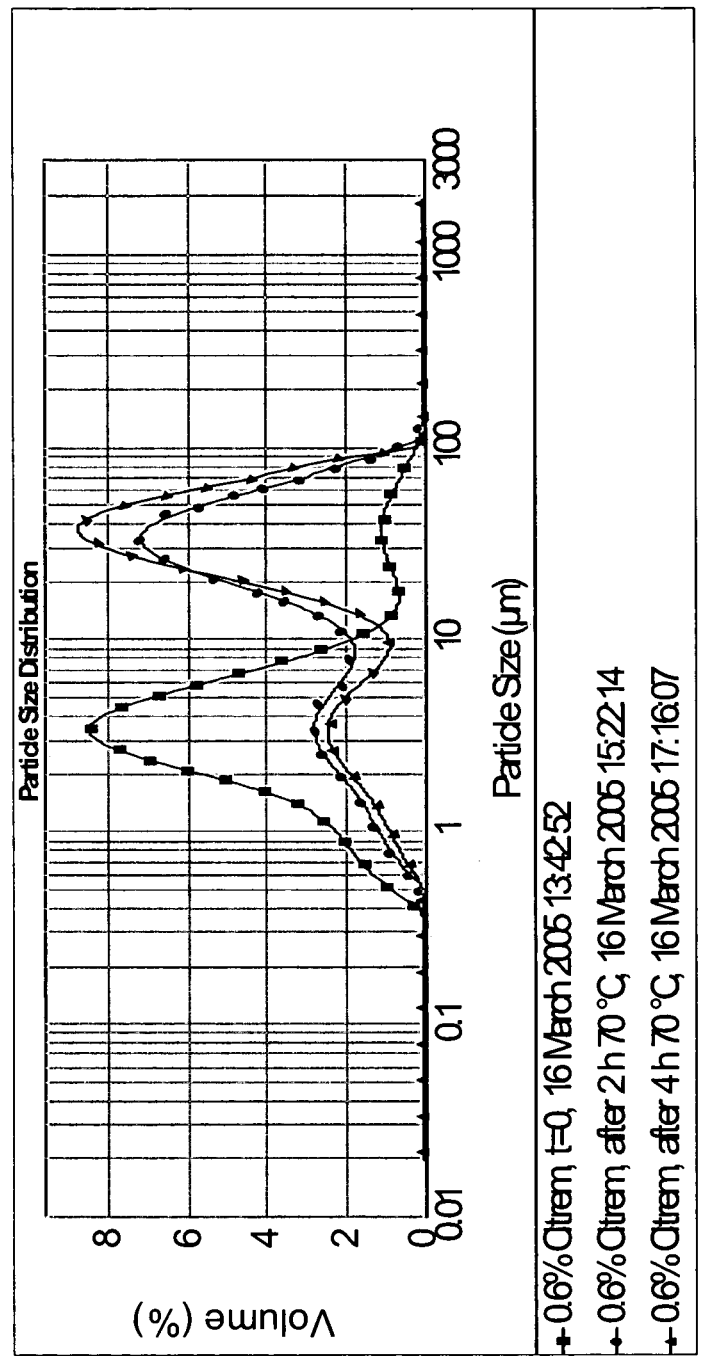
FIG. 4 illustrates the change in particle size distribution over time for the system with 0.6% CITREM N12 at 70° C. at 0 hours, 2 hours, and 4 hours.

The initial particle size distributions for the three systems are shown in FIG. 3. It was determined that the particle size distribution shifted to smaller values when the concentration of CITREM N12 was increased. With 0.6% CITREM N12, the average particle size was about 3.5 µm while at 1.0% CITREM N12, the average particle size decreased to 2 µm. This means that more and smaller droplets were formed with increasing CITREM N12 concentrations, and that more interface was formed between the oil droplets and the water phase. It is possible that the minimal size of the droplets was limited by the amount of CITREM N12 available for the interface. During storage at 70° C., the particle size distributions shift to higher values, indicating the coalescence of the emulsion droplets (shown in FIG. 4).

For the system with 0.6% CITREM N12 (FIG. 4), the shift was dramatic. After 2 hours at 70° C., the effect was clearly visible and the average particle size increased from 3.5 µm to 35 µm. After 4 hours, more large particles were formed, but the shift was less pronounced than the shift in the first 2 hours.

This effect was also observed in microscopic pictures, taken at t=0 and after 3 hours at 70° C. Strong coalescence was observed. Moreover, directly at homogenization, some clustering of particles was observed. This is an indication that the system is not fully stable and that not all of the surfaces of the oil droplets are completely covered with emulsifier.

Figure 5:
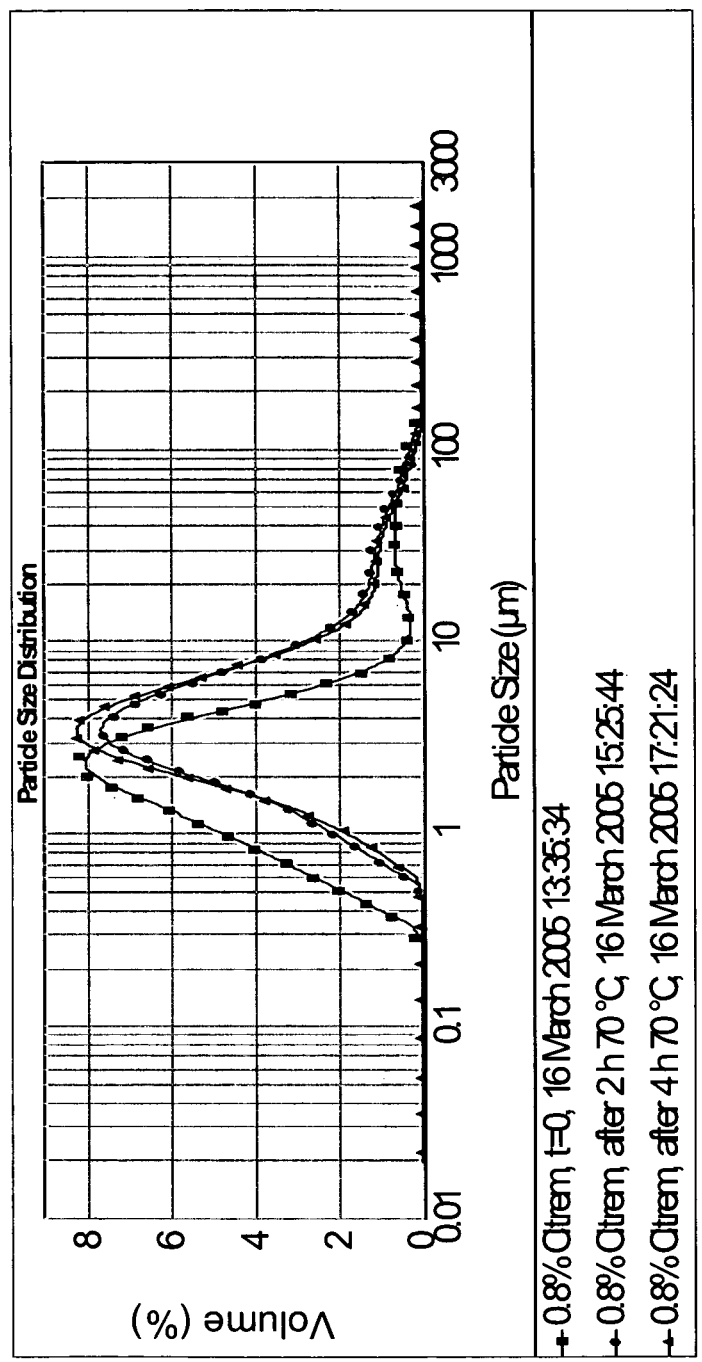
FIG. 5 illustrates the change in particle size distribution over time for the system with 0.8% CITREM N12 at 70° C. at 0 hours, 2 hours, and 4 hours.

When 0.8% CITREM N12 was used, the particle size distribution shifts to higher values (FIG. 5). However, the shift was less pronounced and less dramatic. The average particle size increased from 1.5 µm to 3.5 µm in the first 2 hours. In the subsequent 2 hours, the amount of larger particles of 3.5 µm slightly increased, but no formation of very large particles (as with 0.6% CITREM N12) was observed. This was confirmed with microscopic pictures.

Figure 6:
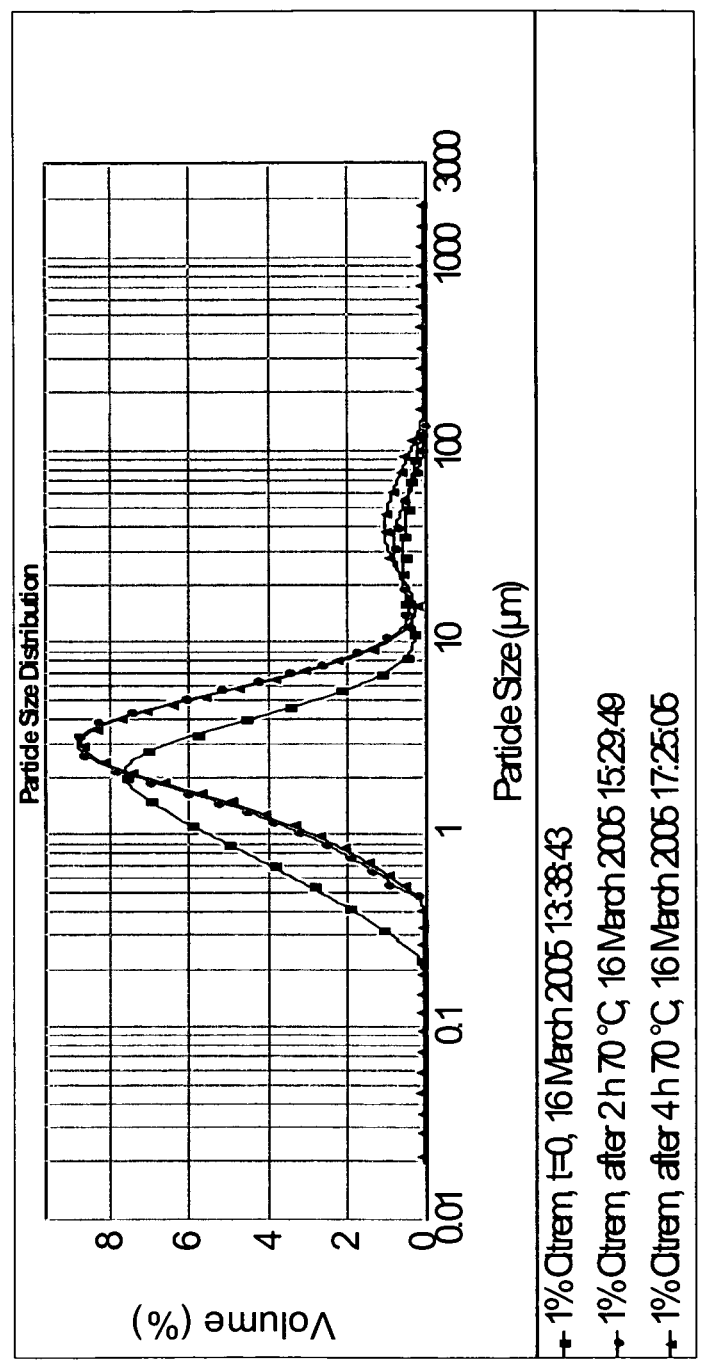
FIG. 6 illustrates the change in particle size distribution over time for the system with 1.0% CITREM N12 at 70° C. at 0 hours, 2 hours, and 4 hours.

The system with 1.0% CITREM N12 was the most stable (FIG. 6). After 4 hours at 70° C., only a slight shift in the particle size distribution was observed, from 2 µm to 3 µm. This was confirmed by microscopic pictures.

When the macroscopic samples were observed after cooling down and overnight storage at room temperature, creaming was observed in the system with 0.6% CITREM N12. The systems with 0.8% and 1.0% remained homogeneous, while the system with 0.6% CITREM N12 illustrated three phases.

Spray Drying Tests: Total Solids 51%

Figure 7:
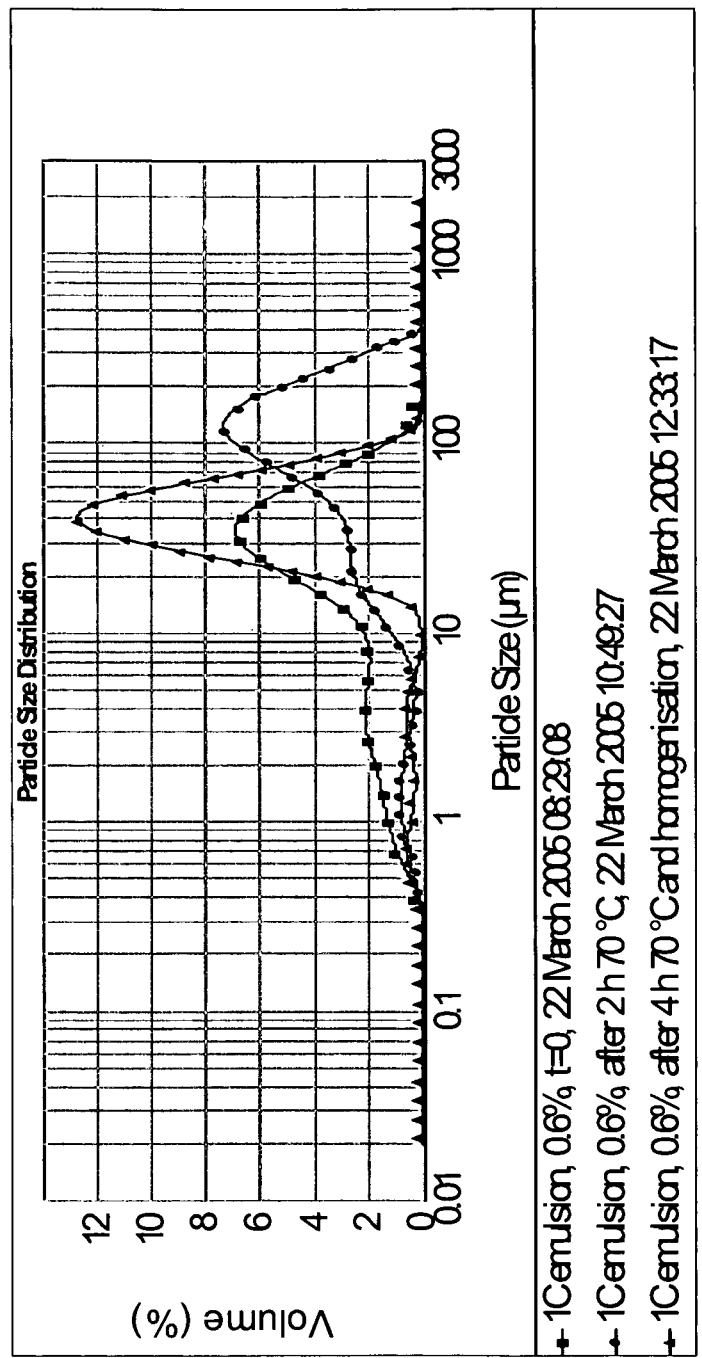
FIG. 7 illustrates particle size distributions for the emulsion stabilized with 0.6% CITREM N12 directly after preparation, after 2 hours storage at 70° C., after 4 hours storage at 70° C., and after a second homogenization.
Figure 8:
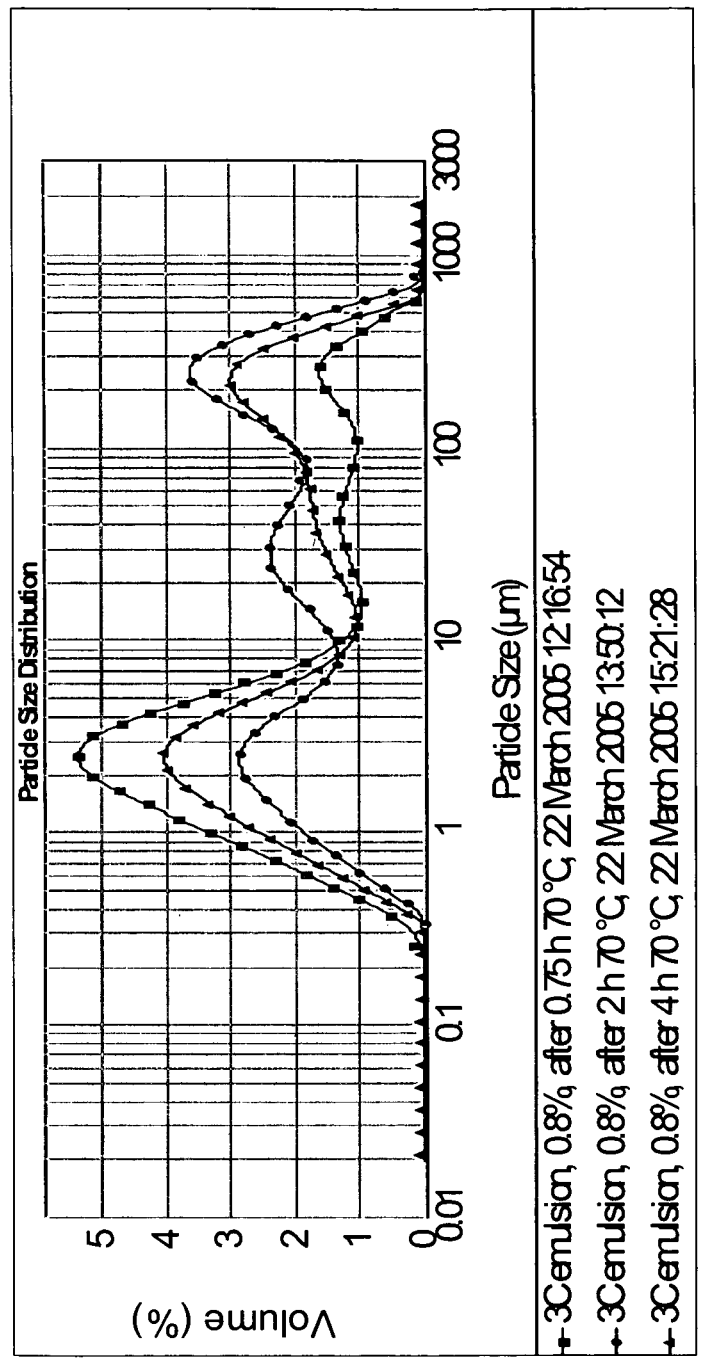
FIG. 8 illustrates particle size distributions for the emulsion prepared with 0.8% CITREM N12, directly after preparation, after 2 hours storage at 70° C., and after 4 hours storage at 70° C.

A series of spray drying tests were performed with 0.6% and 0.8% CITREM N12 and total solids of 51%. Firstly a pre-emulsion was made at 60° C. The pre-emulsion was then heated at 82° C. for 25 seconds, homogenized at 65° C. at 210/35 bar (2-stage homogenizer), and subsequently stored at 70° C. Samples were taken at t=0, t=2 hours, and t=4 hours, and the particle size distribution was measured. The results are depicted in FIGS. 7 and 8 for 0.6% and 0.8% CITREM N12, respectively.

Because the system with 0.6% CITREM N12 (FIG. 7) showed severe oil separation after storage at 70° C. for 4 hours, the batch was split into two batches. One batch was directly spray dried, while the other batch was again homogenized (210/35 bar) before spray drying. The second time, homogenization rendered a comparable particle size distribution, around 30 to 40 µm, as after the initial homogenization step. The system with 0.8% CITREM N12 (FIG. 8) showed a slight coarsening during storage at 70° C. The emulsion was spray dried using the NIRO 250 and the conditions as given in Table 8.

TABLE 8

Spray drying parameters for the 0.6% and 0.8% CITREM N12 emulsions.

| Code | Description | Solids emulsion [%] | Observation after storage | Moisture powder [%] |
|---|---|---|---|---|
| 1C | 0.6% CITREM N12 | — | Oil separation | 1.79 |
| 1C-DH | 0.6% CITREM N12 double homogen. | 50.4 | Creaming | 2.48 |
| 3C | 0.8% CITREM N12 | 50.4 | Slight oil separation | 1.73 |

The total yield of the spray drying test was:
3.5 kg powder and 3 kg sweepings for 1C;
7 kg powder and 4 kg sweepings for 1C-DH; and
14 kg powder and 3 kg sweepings for 3C.

Some fouling was observed in the chamber, and slightly more in the cyclone. The system with 0.6% CITREM N12 showed more fouling when the system was not homogenized for a second time. In all cases the yield was relatively low. This could be explained by the fact that the powder is very fine and some powder may have disappeared by the air outlet.

The viscosity of the emulsions was relatively low (based on visual observation) before spray drying. This indicates that the solids content could be optimized.

Total Solids 60%

Figure 9:
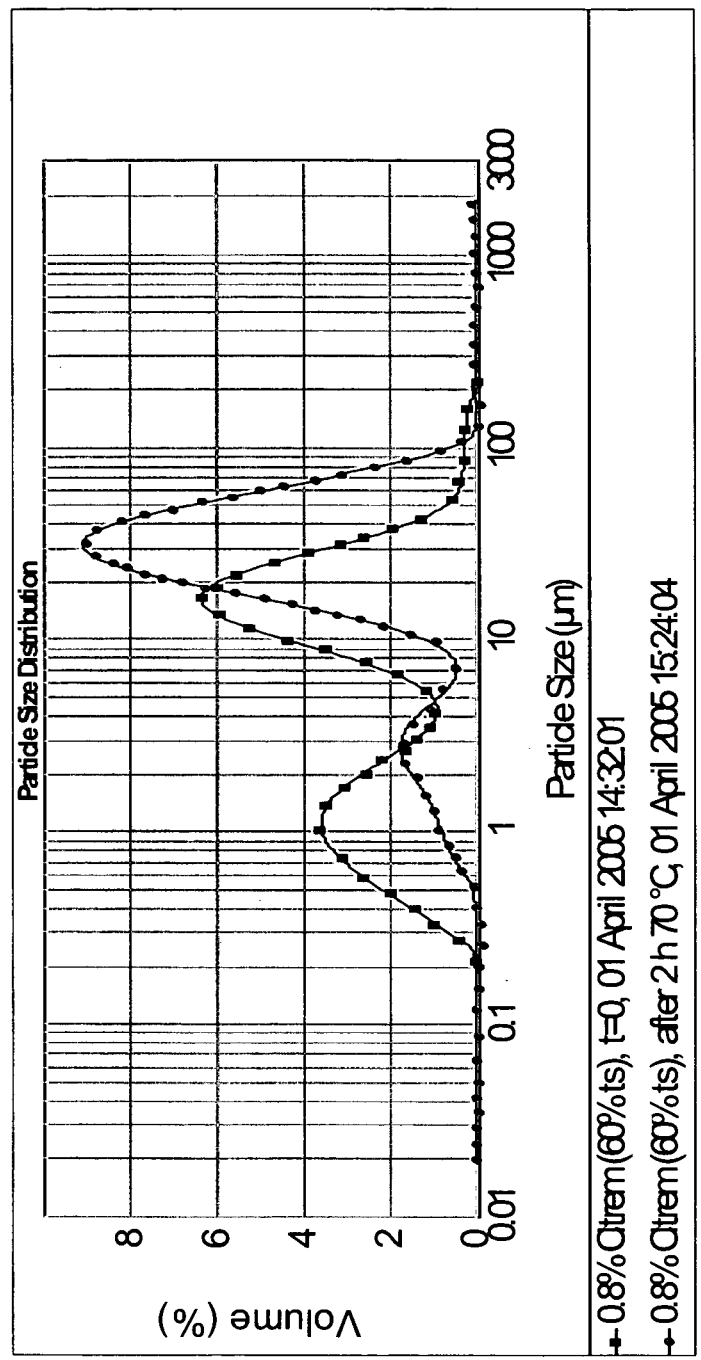
FIG. 9 illustrates particle size distributions of the emulsions having 60% total solids stabilized with 0.96% CITREM N12, before and after storage for 2 hours at 70° C.

In order to realize a first optimization step with respect to the increase in total solids, a system with the full formulation was prepared on lab scale using less water. This resulted in an emulsion with 60% of total solids. The ratio of emulsifier to oil was kept constant. Instead of 0.8% for 51% total solids, 0.96% CITREM N12 was used for 60% total solids. This ensured that there was enough emulsifier for the total area of the interface between the oil droplets and the continuous phase. The particle size distribution was measured directly after preparation and again after 2 hours storage at 70° C. (shown in FIG. 9). The viscosity of the system was measured to be 132 mPa s.

It was observed that storage at elevated temperatures had more effect on the coalescence of droplets as compared to the systems with 51% total solids. Moreover, the particle size distribution shifts to higher values with increasing total solids. This could be explained by an increase in the viscosity of the system. With an increase in viscosity, it is possible that larger droplets were formed with the same homogenization pressures.

Figure 10:
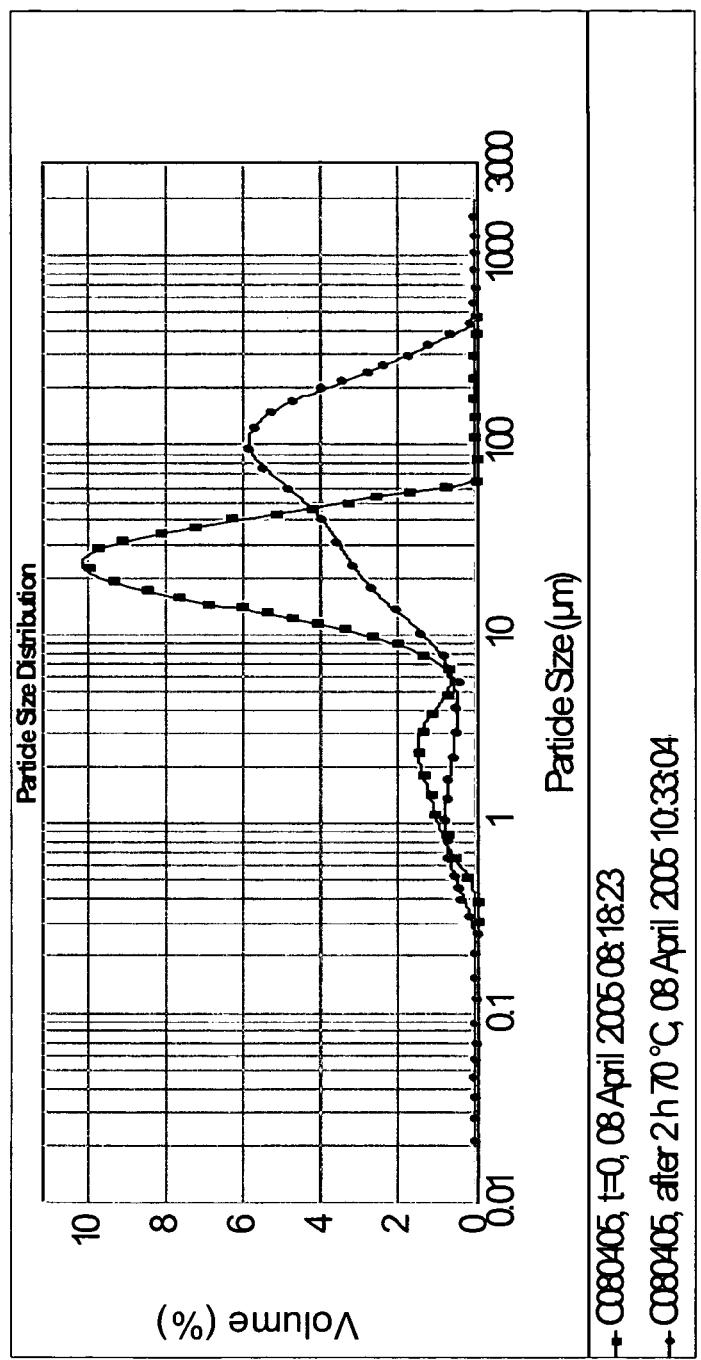
FIG. 10 illustrates the particle size distribution of emulsions having 60% total solids stabilized with 0.96% CITREM N12, before and after 2 hours storage at 70° C.

Since the system with 60% total solids was relatively stable (no oil separation was observed), spray drying trials were pursued. The emulsion was prepared on 75 kg scale, including heating for 25 seconds at 82° C., homogenization at 210/35 bar, and storage for 2 hours at 70° C. Particle size distributions before and after storage at 70° C. are depicted in FIG. 10. From the particle size distribution and microscopy pictures which were examined, coalescence was observed. However, no oil separation was observed.

TABLE 9

Spray drying parameters for the emulsion with 60% total solids, and CITREM N12 as emulsifier.

| Code | Description | Solids emulsion [%] | Moisture powder [%] |
|---|---|---|---|
| 4C | 0.96% CITREM N12 | 59.9 | 1.94 |

The total yield of the spray drying test was 25 kg powder, and 5 kg sweepings.

Example 5

This example illustrates the evaluation of DATEM for use as an emulsifier in the nutritional formulation of the present invention. Two versions of DATEM were obtained from Danisco A/S: Panodan 165 and Panodan 517. The difference between Panodan 165 and 517 is the amount of tartaric acid that is used to esterify the monoglycerides.

Emulsion Stability

In order to assess the stability of emulsions emulsified with DATEM, the systems were first tested with respect to the sensitivity to calcium ions.

Calcium Sensitivity

In a first series of experiments with DATEM, emulsions were prepared on lab scale using a Turrax® dispersing instrument. All soluble salts except calcium hydroxide were added (total solids 51%). Subsequently, various amounts of calcium chloride were added, rendering systems with concentrations of calcium chloride from 0 mM to 20 mM. These systems were stored at 70° C. for 2½ hours and the stability was assessed visually. Three concentrations of DATEM were used: 0.6%, 0.8% and 1.0%. Panodan 165 was found to render smaller droplets than Panodan 517. This was also observed after storage. More creaming was observed with the systems prepared with Panodan 517 than with Panodan 165, irrespective of the concentration used. No instabilities were observed for the DATEM emulsions.

Full Formulations

Figure 11:
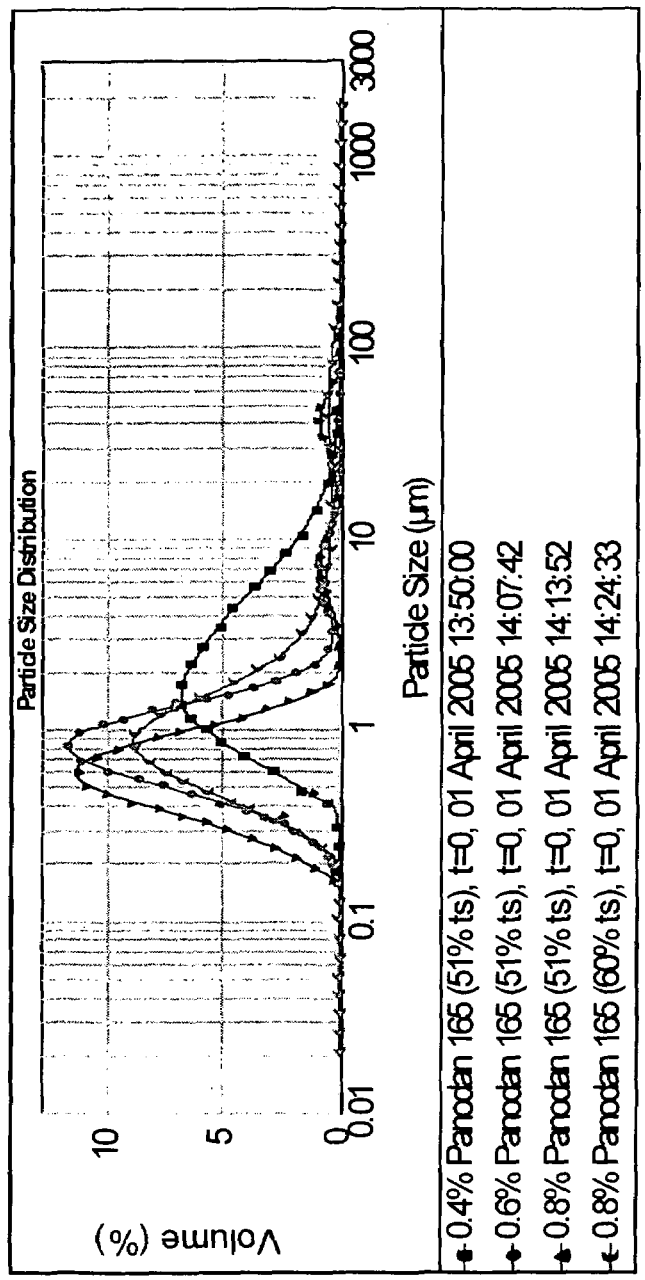
FIG. 11 illustrates particle size distributions for emulsions prepared with Panodan 165.
Figure 12:
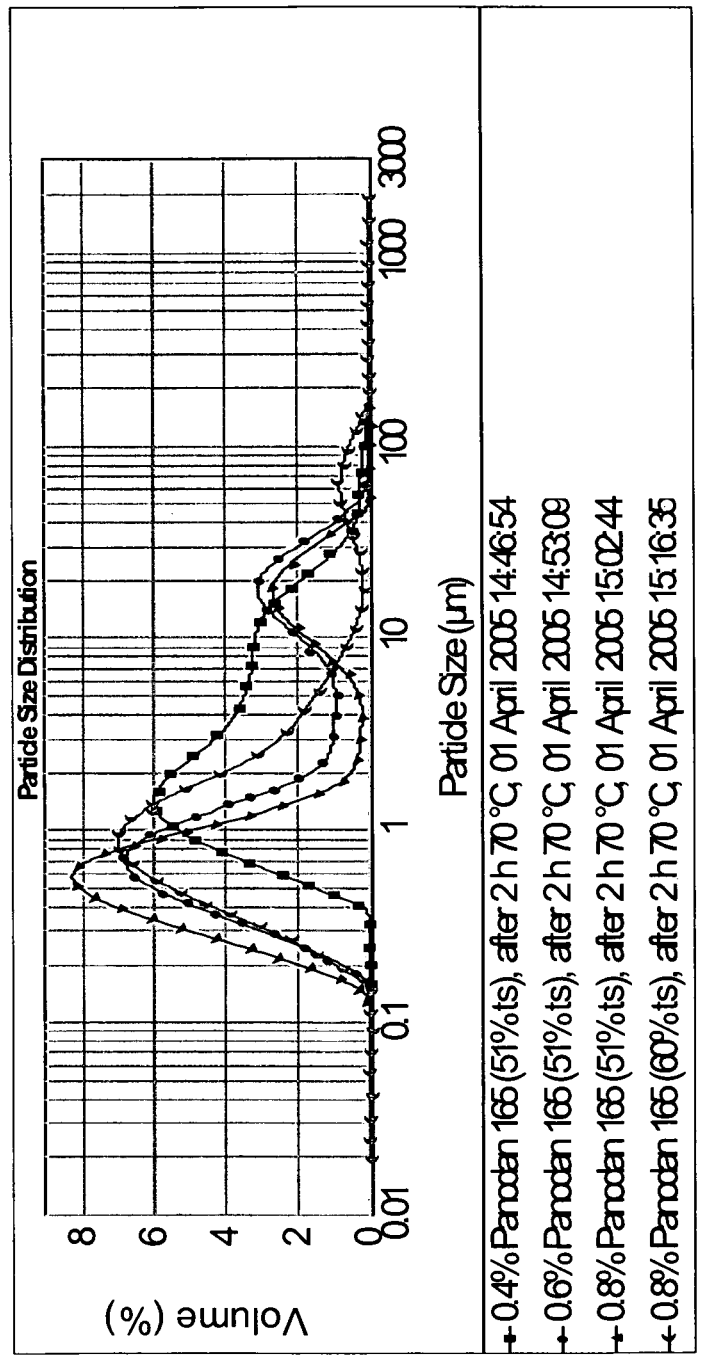
FIG. 12 illustrates particle size distributions for emulsions prepared with Panodan 165 after 2 hours storage at 70° C.
Figure 13:
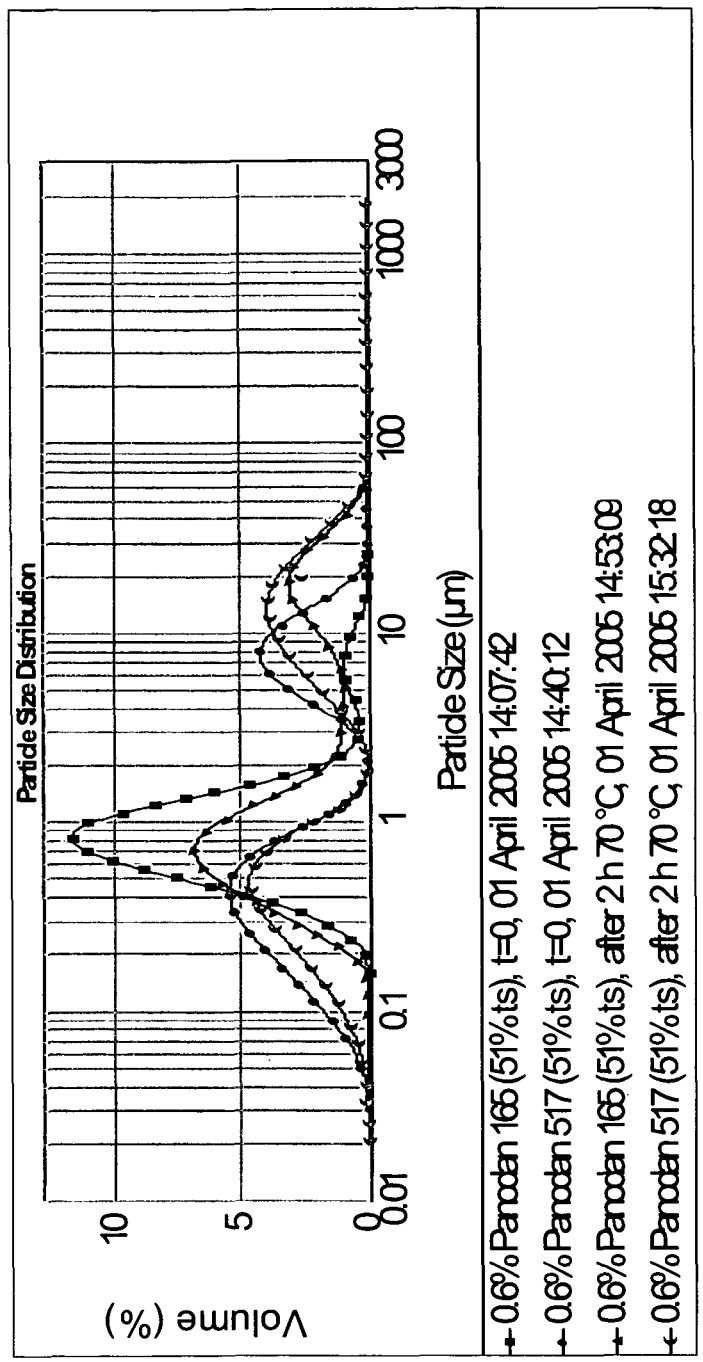
FIG. 13 illustrates particle size distributions of emulsions stabilized with 0.6% Panodan 165 and 0.6% Panodan 517, before and after storage at 70° C. for 2 hours.

Because Panodan 165 rendered the smallest droplets when emulsions were prepared with a Turrax®, the emphasis of the experimental work was on this emulsifier. Emulsions were prepared, including all soluble and insoluble salts, using homogenization at 210/35 bar at 60° C. These emulsions were stored at 70° C. for 2 hours. Particle size distributions were measured (FIGS. 11 and 12) and microscopy pictures were taken. Five systems were prepared:
0.4% Panodan 165, with 51% total solids
0.6% Panodan 165, with 51% total solids
0.8% Panodan 165, with 51% total solids
0.96% Panodan 165, with 60% total solids (denoted as 0.8%, 60% ts in figures)
0.6% Panodan 517, with 51% total solids As expected, the droplet size distribution for the Panodan 165 systems, before and after storage at 70° C. for 2 hours, moved to larger values with decreasing levels of emulsifier. Furthermore, the droplet size distribution also moved to larger values with increasing amounts of total solids, as also observed for the systems with CITREM N12 as the emulsifier. Storage at elevated temperature (70° C.) shifts the distribution to slightly higher values. More precisely, a more pronounced bimodal distribution becomes apparent due to the coalescence of droplets. This is most clearly observed in FIG. 13, where Panodan 165 and 517 were compared before and after storage at 70° C. for 2 hours. This was confirmed by microscopy pictures.

The viscosity of the system with 51% total solids and 0.8% Panodan 165 was measured to be 30 mPa s, while the viscosity of the system with 60% total solids and 0.96% Panodan 165 was measured to be 132 mPa s.

Spray Drying Trials with DATEM

Because all systems with DATEM rendered stable emulsions, the spray drying trials were directly performed with 60% total solids.

Two emulsions were prepared by first making a pre-emulsion using 0.96% Panodan 165 and 0.96% Panodan 517. These concentrations were the same as for the CITREM N12 system in order to be able to compare the systems.

Subsequently, the systems were heated at 82° C. for 25 seconds, and homogenized at 210/35 bar at 65° C. The systems were then stored at 70° C. for 2 hours before feeding into the NIRO 250 spray dryer.

Figure 14:
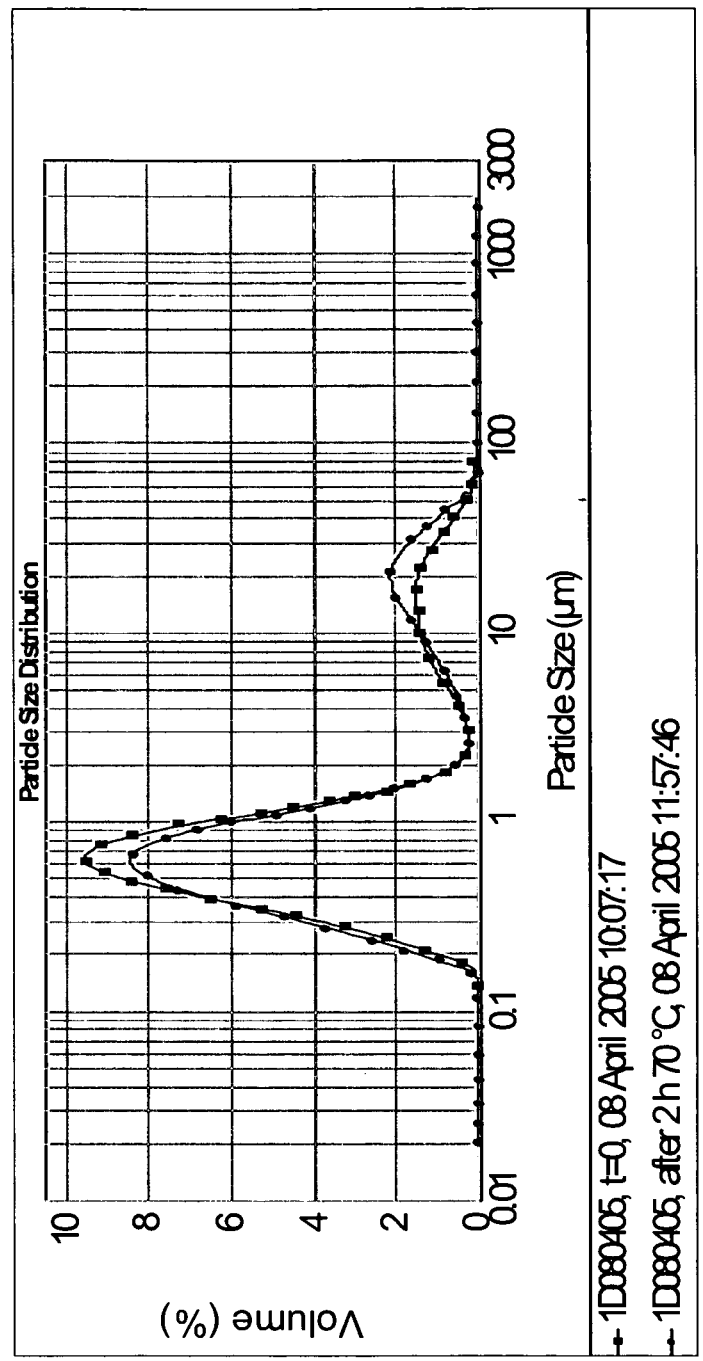
FIG. 14 illustrates the particle size distribution of an emulsion stabilized with Panodan 165 before and after storage at 70° C. for 2 hours.
Figure 15:
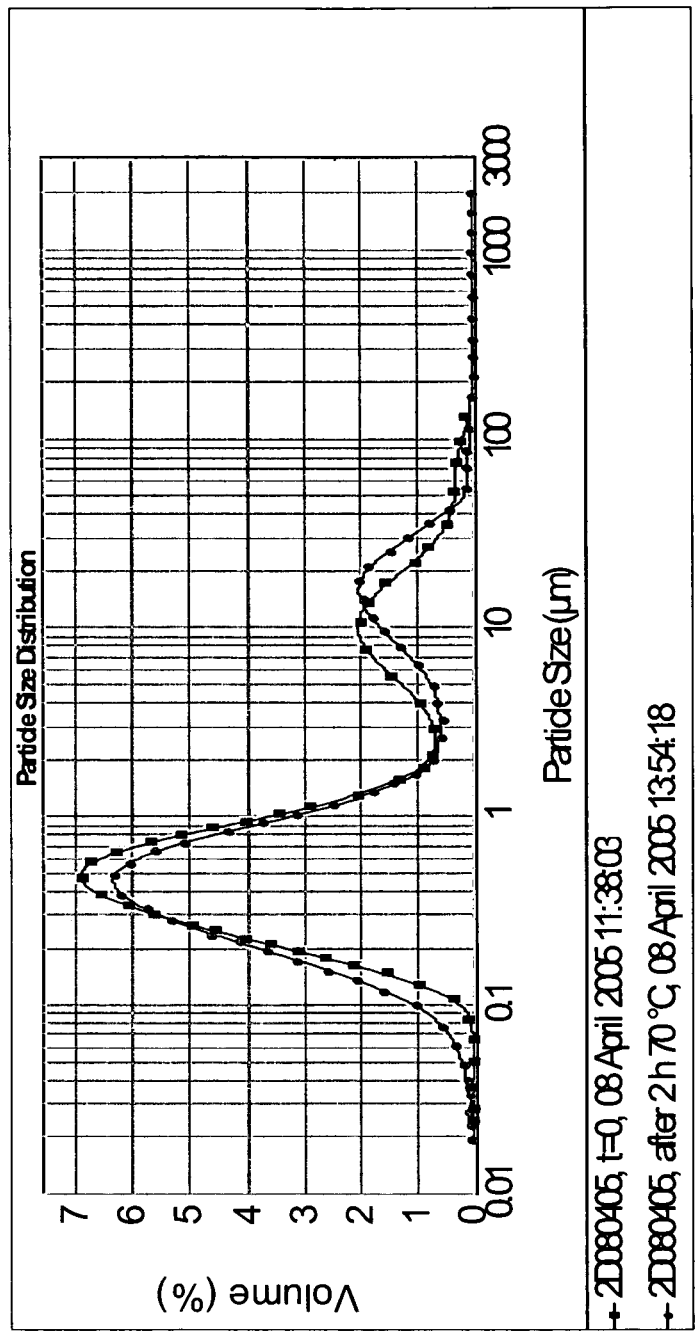
FIG. 15 illustrates the particle size distribution of an emulsion stabilized with Panodan 517 before and after storage at 70° C. for 2 hours.

The particle size distributions are given in FIGS. 14 and 15. It was remarkable to observe that there was scarcely any shift in the particle size distribution before and after storage at 70° C. for 2 hours. Panodan 517 (FIG. 15) showed slightly more coalescence than Panodan 165 (FIG. 14).

TABLE 10

Spray drying parameters for the emulsion with 60% total solids, and DATEM as emulsifier

| Code | Description | Solids emulsion [%] | Moisture powder [%] |
|---|---|---|---|
| 5D | 0.96% Panodan 165 | 59.8 | 1.71 |
| 6D | 0.96% Panodan 517 | 59.8 | 1.72 |

The total yield of the spray drying tests were 28 kg powder and 5 kg sweepings for the system with Panodan 165 and 28.5 kg powder and 3.5 kg sweepings for the system with Panodan 517.

Example 6

This example illustrates the conclusions of the above study regarding the evaluation of various emulsifiers to be utilized in the nutritional formulation of the present invention.

When monoglycerides were evaluated as emulsifiers, no stable emulsions were obtained, regardless of whether salts were present in the emulsion. This corresponds with the fact that monoglycerides are usually used for water-in-oil emulsions, instead of oil-in-water emulsions.

When lecithins were evaluated as possible emulsifiers for the nutritional formulation of the present invention, stable emulsions were formed in some situations. The influence of salts, especially calcium ions, was strongly observed. The addition of 5 to 10 mM calcium chloride often induced coalescence, creaming, and free oil separation. These effects were accelerated during storage at 70° C.

From the commercially available lecithins studied, Topcithin NGM (food grade) and PS90 (pharmaceutical grade) rendered the most stable emulsions. Spray drying trials were performed with Topcithin NGM and the residence time of the emulsion at 70° C. was minimized to less than 10 minutes. Powders were obtained, although fouling in the spray dryer was considerable.

An option for a non-soy lecithin is Solec Z, obtained from sunflower oil. This sample was obtained at a later stage in the project, however, and has not been tested on emulsion stability.

The present study found that esterified monoglycerides such as CITREM and DATEM created very stable emulsions. For CITREM, the influence of pH on the emulsion stability was studied and it was found that for high pH values (pH=9, 10), the systems became less stable. The emulsion stability at elevated temperatures (70° C.) can be directly related to the concentration of emulsifier, where higher concentrations of emulsifier render more stable systems. Increasing the concentration of emulsifier also reduces the particle size. For CITREM N12, the particle size was reduced from 3.5 μm (0.6%) to 2 μm (1.0%), while for DATEM (Panodan 165), the particle size was reduced from 1.2 μm (0.4%) to 0.6 μm (0.8%).

Increasing the amount of dry substance from 50% to 60% slightly decreases the emulsion stability, and coalescence was observed. However, in the present study no free oil separation was observed during multiple hours at 70° C.

Spray drying tests with CITREM N12 and DATEM were performed with 50% total solids as well as with 60% total solids. The concentrations of emulsifier used were 0.8% for the systems with 50% total solids and 0.96% for the systems with 60% total solids. In all cases, powders could be produced.

Example 7

This example illustrates one embodiment of an nutritional formulation of the present invention. Table 18 illustrates the ingredients present in an embodiment of the present liquid nutritional supplement and their amounts in grams (g) or kilograms (kg), expressed per 100 kg.

TABLE 11

Ingredient Information and Concentrations (Per 100 kg)

| Ingredient, Unit | Per 100 kg |
|---|---|
| Corn Syrup Solids, kg | 33.763 |
| Fat Blend, Bulk, kg | 25.926 |
| Palm Olein Oil | 11.667 |
| Soybean Oil | 5.185 |
| Coconut Oil | 5.185 |
| High Oleic Sunflower Oil | 3.889 |
| Calcium Phosphate Dibasic, kg | 1.600 |
| Potassium Citrate, kg | 1.333 |
| Single Cell ARA and DHA, kg | 0.724 |
| CITREM, kg | 0.488 |
| Calcium Citrate, kg | 0.330 |
| Sodium Citrate Dihydrate Granular, kg | 0.273 |
| Potassium Chloride, kg | 0.189 |
| Choline Chloride, kg | 0.196 |
| Magnesium Oxide, Light, kg | 0.091 |
| Calcium Hydroxide, kg | 0.065 |
| L-Carnitine, g | 14.398 |
| Sodium Iodide, g | 0.095 |
| Corn Syrup Solids, kg | 14.540 |
| L-Leucine, kg | 1.736 |
| Lysine Hydrochloride, kg | 1.408 |
| L-Valine, kg | 1.068 |
| L-Isoleucine, kg | 0.956 |
| Corn Syrup Solids, kg | 0.890 |
| L-Threonine, kg | 0.864 |
| L-Tyrosine, kg | 0.765 |
| L-Phenylalanine, kg | 0.708 |
| L-Histidine, kg | 0.371 |
| L-Cystine, kg | 0.371 |
| L-Tryptophan, kg | 0.337 |
| L-Methionine, kg | 0.326 |
| L-Aspartic Acid, kg | 2.822 |
| L-Proline, kg | 1.406 |
| L-Alanine, kg | 1.375 |
| Corn Syrup Solids, kg | 1.249 |
| Monosodium Glutamate, kg | 0.967 |
| L-Serine, kg | 0.865 |
| L-Arginine, kg | 0.745 |
| Glycine, kg | 0.371 |
| Ascorbic Acid, g | 149.352 |
| Inositol, g | 99.541 |
| Corn Syrup Solids, Low Sodium, DE 24, g | 62.377 |
| Taurine, g | 35.343 |
| Tocopheryl Acetate, Dry, g | 25.792 |
| Vitamin A Beadlets, g | 7.967 |
| Niacinamide, g | 6.416 |
| Vitamin $K_1$, Dry 1%, g | 5.078 |
| Calcium Pantothenate, g | 3.982 |

TABLE 11-continued

Ingredient Information and Concentrations (Per 100 kg)

| Ingredient, Unit | Per 100 kg |
|---|---|
| Vitamin $B_{12}$, 0.1% in starch, g | 2.337 |
| Biotin Trituration 1%, g | 2.176 |
| Vitamin $D_3$ Powder, g | 0.850 |
| Thiamine Hydrochloride, g | 0.633 |
| Riboflavin, g | 0.580 |
| Pyridoxine Hydrochloride, g | 0.455 |
| Folic Acid, g | 0.121 |
| Corn Syrup Solids, g | 211.803 |
| Zinc Sulfate, Monohydrate, g | 14.126 |
| Sodium Selenite, SC in Corn Syrup Solids, g | 7.050 |
| Cupric Sulfate, Powder ($CuSO_4 5H_2O$), g | 1.692 |
| Manganese Sulfate, Monohydrate, g | 0.329 |
| Corn Syrup Solids, g | 172.039 |
| Ferrous Sulfate, g | 44.400 |
| Ascorbic Acid, g | 5.561 |

Table 19 illustrates the concentration of relevant components in the nutritional supplement of Example 7.

TABLE 12

Component Concentrations

| Component, Unit | Per 100 g Powder | Per 100 mL |
|---|---|---|
| Protein Equivalent, g | 14.34 | 1.95 |
| Lipid, g | 27.16 | 3.69 |
| Carbohydrate, g | 53.52 | 7.28 |
| Ash, g | 2.7 | 0.37 |
| Moisture, g | 2.28 | 86.71 |
| Calories, kcal | 508.3 | 69.1 |

The caloric distribution of the nutritional supplement of Example 7 is depicted in Table 20.

TABLE 13

Caloric Distribution

| Component | Caloric Percentages |
|---|---|
| Protein Equivalent | 11.12% |
| Lipid | 47.36% |
| Carbohydrate | 41.52% |

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties to the extent that they do not contradict anything contained herein.

The discussion of the references herein is intended merely to summarize the assertions made by their authors and no admission is made that any reference constitutes prior art. Applicants reserve the right to challenge the accuracy and pertinence of the cited references.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part.

What is claimed is:

1. A protein-free, amino acid-based infant formula comprising, per 100 g total amino acids, between 4.5 and 5 g glutamate, wherein the ratio of cysteine:methionine is 0.9:1 to 1:1.2 and wherein an average particle size of the infant formula is in a range of 0.6 µm to 3.5 µm.

2. The infant formula of claim 1 comprising 5 g glutamate.

3. The infant formula of claim 1 comprising between 150 and 200 mg glutamate per 100 kcal of the infant formula.

4. The infant formula of claim 1 comprising between 160 and 180 mg glutamate per 100 kcal of the infant formula.

5. The infant formula of claim 1 comprising 167 mg glutamate per 100 kcal of the infant formula.

6. The infant formula of claim 1 wherein glutamate comprises 5% of the total amino acids.

7. The infant formula of claim 1, wherein the ratio of cysteine:methionine is 1:1.138.

8. The infant formula of claim 1 comprising between 50 and 100 mg cysteine per 100 kcal of the infant formula.

9. The infant formula of claim 1 comprising between 60 and 80 mg cysteine per 100 kcal of the infant formula.

10. The infant formula of claim 1 comprising between 70 and 75 mg cysteine per 100 kcal of the infant formula.

11. The infant formula of claim 1 comprising 73.5 mg cysteine per 100 kcal of the infant formula.

12. The infant formula of claim 1 comprising between 50 and 100 mg methionine per 100 kcal of the infant formula.

13. The infant formula of claim 1 comprising between 60 and 80 mg methionine per 100 kcal of the infant formula.

14. The infant formula of claim 1 comprising between 60 and 70 mg methionine per 100 kcal of the infant formula.

15. The infant formula of claim 1 comprising 64.6 mg methionine per 100 kcal of the infant formula.

16. The infant formula of claim 1, further comprising citric acid glyceride ester.

17. The infant formula of claim 1 in a form selected from the group consisting of powder, liquid, and ready-to-use.

18. A protein-free infant formula comprising:
a) 3 to 7 grams of a lipid source per 100 kcal of infant formula;
b) 8 to 12 grams of a carbohydrate source per 100 kcal of infant formula;
c) an emulsifier comprising citric acid glyceride ester; and
d) amino acids, wherein glutamate is present in an amount of between 4.5 and 5 g per 100 g total amino acids, wherein the ratio of cysteine:methionine is 0.9:1 to 1:1.2 and wherein an average particle size of the infant formula is in a range of 0.6 µm to 3.5 µm.

19. The infant formula according to claim 18, wherein citric acid glyceride ester is present in an amount of between 0.1 and 1.0 kg/100 kg infant formula.

20. The infant formula according to claim 18, wherein citric acid glyceride ester is present in an amount of between 0.4 and 0.5 kg/100 kg infant formula.

21. The infant formula according to claim 18, wherein citric acid glyceride ester is present in an amount of 0.488 kg/100 kg infant formula.

22. The infant formula according to claim 18, wherein the pH of the infant formula is between 6 and 7.

23. The infant formula of claim 18 in a form selected from the group consisting of powder, liquid, and ready-to-use.

24. The infant formula of claim 18, wherein the viscosity of the infant formula is less than 20 cps at ambient temperature.

25. The infant formula of claim 1, wherein the infant formula contains no measurable amount of protein.

26. A protein-free, nutritionally complete infant formula comprising, 3 to 7 grams of a lipid source per 100 kcal of infant formula; 8 to 12 grams of a carbohydrate source per 100 kcal of infant formula; and between 4.5 and 5 g glutamate per 100 g total amino acids, wherein the ratio of cysteine:methionine is 0.9:1 to 1:1.2 and wherein an average particle size of the infant formula is in a range of 0.6 μm to 3.5 μm.

27. The infant formula of claim 26 comprising 5 g glutamate.

28. The infant formula of claim 26 comprising between 150 and 200 mg glutamate per 100 kcal of the infant formula.

29. The infant formula of claim 26 comprising between 160 and 180 mg glutamate per 100 kcal of the infant formula.

30. The infant formula of claim 26, wherein glutamate comprises 5% of the total amino acids.

31. The infant formula of claim 26, wherein the ratio of cysteine:methionine is 1:1.138.

32. The infant formula of claim 26 comprising between 50 and 100 mg cysteine per 100 kcal of the nutritional formulation.

33. The infant formula of claim 26 comprising between 60 and 80 mg cysteine per 100 kcal of the infant formula.

34. The infant formula of claim 26 comprising between 70 and 75 mg cysteine per 100 kcal of the infant formula.

35. The infant formula of claim 26 comprising 73.5 mg cysteine per 100 kcal of the infant formula.

36. The infant formula of claim 26 comprising between 50 and 100 mg methionine per 100 kcal of infant formula.

37. The infant formula of claim 26 comprising between 60 and 80 mg methionine per 100 kcal of the infant formula.

38. The infant formula of claim 26, further comprising citric acid glyceride ester.

39. The infant formula of claim 26 in a form selected from the group consisting of powder, liquid, and ready-to-use.

* * * * *